(12) United States Patent
Ayai

(10) Patent No.: US 10,284,113 B2
(45) Date of Patent: May 7, 2019

(54) POWER CONVERSION DEVICE PERFORMING DC/AC POWER CONVERSION VIA INTERMEDIATE BUS, AND CONTROL METHOD THEREOF

(71) Applicant: Sumitomo Electric Industries, Ltd., Osaka-shi (JP)

(72) Inventor: Naoki Ayai, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 15/764,507

(22) PCT Filed: Jul. 4, 2016

(86) PCT No.: PCT/JP2016/069780
§ 371 (c)(1),
(2) Date: Mar. 29, 2018

(87) PCT Pub. No.: WO2017/068814
PCT Pub. Date: Apr. 27, 2017

(65) Prior Publication Data
US 2018/0287511 A1    Oct. 4, 2018

(30) Foreign Application Priority Data
Oct. 19, 2015  (JP) .................... 2015-205346

(51) Int. Cl.
*H02M 7/48* (2007.01)
*H02M 7/5387* (2007.01)
(Continued)

(52) U.S. Cl.
CPC ......... *H02M 7/53871* (2013.01); *H02M 1/14* (2013.01); *H02M 3/158* (2013.01);
(Continued)

(58) Field of Classification Search
CPC .. H02M 2001/0067; H02M 7/42; H02M 7/44; H02M 7/48; H02M 2007/4803;
(Continued)

(56) References Cited

U.S. PATENT DOCUMENTS

2005/0071050 A1*  3/2005  Chow .................. G05F 1/70
                                                 700/286
2010/0008119 A1*  1/2010  O'Brien ............ H01L 31/02021
                                                 363/132
(Continued)

FOREIGN PATENT DOCUMENTS

JP     2014-241714 A    12/2014
JP     2014-241715 A    12/2014

*Primary Examiner* — Alex Torres-Rivera
(74) *Attorney, Agent, or Firm* — Baker Botts L.L.P.; Michael A. Sartori

(57) ABSTRACT

This power conversion device performs DC/AC power conversion via an intermediate bus, and includes: a first DC/DC converter provided between a DC power supply and the intermediate bus; a second DC/DC converter provided between a DC-side capacitor and the intermediate bus; an intermediate capacitor connected to the intermediate bus; a DC/AC converter provided between the intermediate bus and an AC grid; and a control unit configured to control the first DC/DC converter, the second DC/DC converter, and the DC/AC converter, the control unit making such current command value setting that mainly the second DC/DC converter supplies a reactive current flowing through the intermediate bus.

15 Claims, 22 Drawing Sheets

(51) Int. Cl.
*H02M 1/14* (2006.01)
*H02M 3/158* (2006.01)
*H02M 1/42* (2007.01)
*H02J 3/38* (2006.01)
*H02M 1/00* (2006.01)

(52) U.S. Cl.
CPC ............... *H02M 7/48* (2013.01); *H02J 3/383* (2013.01); *H02M 1/4225* (2013.01); *H02M 2001/0054* (2013.01)

(58) Field of Classification Search
CPC ...... H02M 7/4826; H02M 7/53; H02M 7/533; H02M 7/537; H02M 7/5387; H02M 7/53871; H02M 7/53873; H02J 3/383
USPC .... 323/207, 266, 267, 271, 272; 363/40, 41, 363/95, 97, 98, 120, 131
See application file for complete search history.

(56) References Cited

U.S. PATENT DOCUMENTS

| | | | |
|---|---|---|---|
| 2013/0328397 A1* | 12/2013 | Lee ........................... | H02J 3/32 307/23 |
| 2014/0375128 A1* | 12/2014 | Vieillard ................... | H02J 1/14 307/34 |
| 2016/0099572 A1* | 4/2016 | Gupta ..................... | H02J 3/383 307/52 |
| 2016/0164310 A1* | 6/2016 | Juntunen ................. | H02J 7/007 320/134 |
| 2016/0294182 A1* | 10/2016 | Li .............................. | H02J 1/00 |
| 2016/0359415 A1* | 12/2016 | Friebe ............... | H02M 7/53871 |
| 2017/0018932 A1* | 1/2017 | Pahlevaninezhad .... | H02J 3/385 |
| 2017/0077704 A1* | 3/2017 | Faley ....................... | H02J 3/14 |

* cited by examiner

POWER CONVERSION DEVICE PERFORMING DC/AC POWER CONVERSION VIA INTERMEDIATE BUS, AND CONTROL METHOD THEREOF

TECHNICAL FIELD

The present invention relates to a power conversion device and a control method therefor.

This application claims priority on Japanese Patent Application No. 2015-205346 filed on Oct. 19, 2015, the entire contents of which are incorporated herein by reference.

BACKGROUND ART

For converting the voltage of a DC power supply to a single-phase AC voltage, for example, a power conversion device including a boost converter (DC/DC converter) and an inverter circuit is used. In a traditional power conversion device, the voltage of a DC power supply is stepped up by a boost converter to a certain voltage higher than the peak voltage on the AC side, and thereafter, the resultant voltage is converted to an AC voltage by an inverter circuit. In this case, the boost converter and the inverter circuit always perform high-speed switching operations. Therefore, switching loss occurs in each switching element and iron loss occurs in a reactor. These losses become a factor for hampering improvement in conversion efficiency.

Meanwhile, the following control is proposed: while the voltage of the DC power supply and the absolute value of the instantaneous voltage on the AC side are always compared with each other, the boost converter is caused to perform switching operation only during a period in which step-up operation is needed, and the inverter circuit is caused to perform switching operation only during a period in which a step-down operation is needed (see, for example, Patent Literature 1, 2). In such control, the period in which the switching operation is stopped is provided to the boost converter and the inverter circuit. If the stop period is provided, switching loss and reactor iron loss are reduced accordingly, leading to improvement in conversion efficiency.

CITATION LIST

Patent Literature

PATENT LITERATURE 1: Japanese Laid-Open Patent Publication No. 2014-241714
PATENT LITERATURE 2: Japanese Laid-Open Patent Publication No. 2014-241715

SUMMARY OF INVENTION

The present invention is a power conversion device that performs DC/AC power conversion via an intermediate bus, the power conversion device including: a first DC/DC converter provided between a first DC power supply or a load, and the intermediate bus; a second DC/DC converter provided between a DC-side capacitor and the intermediate bus; an intermediate capacitor connected to the intermediate bus; a DC/AC converter provided between the intermediate bus and an AC grid; and a control unit configured to control the first DC/DC converter, the second DC/DC converter, and the DC/AC converter, the control unit making such current command value setting that mainly the second DC/DC converter supplies a reactive current flowing through the intermediate bus.

A control method aspect is a control method for a power conversion device that includes: a first DC/DC converter provided between a first DC power supply or a load, and an intermediate bus; a second DC/DC converter provided between a DC-side capacitor and the intermediate bus; an intermediate capacitor connected to the intermediate bus; a DC/AC converter provided between the intermediate bus and an AC grid; and a control unit configured to control the first DC/DC converter, the second DC/DC converter, and the DC/AC converter, the power conversion device being configured to perform DC/AC power conversion via the intermediate bus, the control method being executed by the control unit and including: making such current command value setting that mainly the second DC/DC converter supplies a reactive current flowing through the intermediate bus.

DESCRIPTION OF EMBODIMENTS

Figure 1:
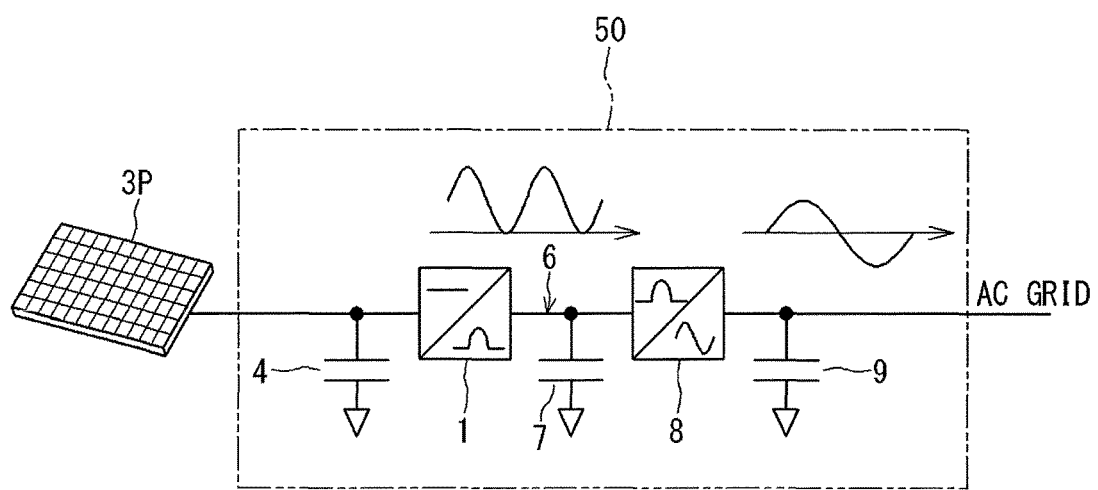
FIG. 1 is a single-line connection diagram showing the schematic configuration of a power conversion device connected to a photovoltaic panel.

[Problems to be Solved by the Present Disclosure]

In the power conversion device of Patent Literature 1 or 2 described above, not only an active current but also a reactive current flows through the boost converter. The amplitude of the reactive current is equal to the amplitude of the active current, and the frequency of the reactive current is twice the fundamental wave on the AC side (frequency: 50 Hz or 60 Hz). Therefore, as compared to the traditional power conversion device through which only an active current flows through a boost converter, the peak value of the current flowing through the boost converter is doubled, and also, the effective value thereof becomes $(1.5^{1/2})$ times greater. Therefore, as the boost converter, the one that can withstand such a current needs to be used. As a result, the size of the boost converter increases.

In addition, in order to prevent a reactive current from flowing through the DC power supply, it is necessary to provide a large-capacity capacitor between the DC power supply and the boost converter, to absorb the reactive current. For example, in a case where the DC power supply is a photovoltaic panel, the output impedance of the panel is great. Therefore, the reactive current can be almost absorbed even by a comparatively small-capacity capacitor.

However, in a case where the DC power supply is a storage battery, the output impedance is smaller as compared to a case of the photovoltaic panel. In this case, it is impossible to absorb the reactive current by only the capacitor. Thus, the reactive current flows through the storage battery, so that losses occurring in the electric path between the storage battery and the power conversion device and inside the storage battery increase. Such losses become a factor for hampering improvement in conversion efficiency.

In view of the above problem, an object of the present disclosure is to provide a power conversion device and a control method therefor, that achieve further compactification and further enhancement of conversion efficiency.

[Effects of the Present Disclosure]

The power conversion device and the control method therefor of the present disclosure can achieve further enhancement of conversion efficiency and further compactification.

[Summary of Embodiments]

Summary of the embodiments of the present invention includes at least the following.

(1) This is a power conversion device that performs DC/AC power conversion via an intermediate bus, the power conversion device including: a first DC/DC converter provided between a first DC power supply or a load, and the intermediate bus; a second DC/DC converter provided between a DC-side capacitor and the intermediate bus; an intermediate capacitor connected to the intermediate bus; a DC/AC converter provided between the intermediate bus and an AC grid; and a control unit configured to control the first DC/DC converter, the second DC/DC converter, and the DC/AC converter, the control unit making such current command value setting that mainly the second DC/DC converter supplies a reactive current flowing through the intermediate bus.

In such a power conversion device, mainly the second DC/DC converter is to take on the reactive current, and therefore, conversely, for the first DC/DC converter, the reactive current is reduced and mainly an active current can be caused to flow through the first DC/DC converter. Thus, the peak value of the current of the first DC/DC converter is reduced, conversion efficiency is enhanced, and further compactification can be achieved.

(2) In the power conversion device of (1), for example, the control unit performs control so that a sum of a power passing through the first DC/DC converter and a power passing through the second DC/DC converter coincides with a sum of a reactive power for the intermediate capacitor and a power arising on an AC side of the DC/AC converter.

In this case, the power on the DC side as seen from the intermediate bus coincides with the power on the AC side including the intermediate capacitor. In other words, the power on the DC side never becomes an excessive power greater than the power on the AC side. Therefore, the first DC/DC converter and the second DC/DC converter perform minimum necessary switching operations including the stop periods, and the DC/AC converter performs minimum necessary switching operation including the stop period.

(3) In the power conversion device of (2), a filter circuit including an AC reactor and including an AC-side capacitor on an AC side with respect to the AC reactor may be provided on an AC side of the DC/AC converter, the filter circuit being connected to the AC grid, and the control unit may perform control so that a sum of a power of the AC grid and a power of the AC-side capacitor coincides with a power transferred between the AC reactor and the DC/AC converter.

In this case, powers can still be caused to coincide with each other even while considering the filter circuit. In other words, the control unit performs control considering influence of the filter circuit.

(4) In the power conversion device of any one of (1) to (3), the DC-side capacitor may be an element that closes a terminal end circuit on a DC side.

The second DC/DC converter in this case does not need to supply an active current, but exists only for supplying a reactive current. Thus, a suitable circuit configuration is obtained for preventing the first DC/DC converter from bearing a reactive current.

(5) In the power conversion device of any one of (1) to (3), a second DC power supply may be connected in parallel to both ends of the DC-side capacitor.

The second DC/DC converter in this case can supply not only a reactive current but also an active current.

(6) In the power conversion device of (5), a switch that is openable and closable by the control unit may be provided between the DC-side capacitor and the second DC power supply.

In this case, when the switch is opened, the second DC/DC converter can be used only for supplying a reactive current, and when the switch is closed, the second DC/DC converter can supply not only a reactive current but also an active current.

(7) In the power conversion device of any one of (1) to (6), for example, the control unit sets current command values so that a reactive current flowing through the first DC/DC converter becomes zero and the second DC/DC converter supplies an entire reactive current.

In this case, the peak value of the current of the first DC/DC converter is maximally reduced, conversion efficiency is enhanced, and compactification can be achieved.

(8) In the power conversion device of any one of (1) to (6), for example, the control unit controls, by current command value setting, reactive currents of the first DC/DC converter and the second DC/DC converter so that peak values of currents flowing through the first DC/DC converter and the second DC/DC converter are minimized.

In this case, the current capacities of the two DC/DC converters can be minimized.

(9) In the power conversion device of any one of (1) to (6), for example, the control unit controls, by current command value setting, reactive currents of the first DC/DC converter and the second DC/DC converter so that mean square values of currents flowing through the first DC/DC converter and the second DC/DC converter are minimized.

In this case, resistance losses of the two DC/DC converters can be minimized.

(10) In the power conversion device of (4), for example, the control unit controls, by current command value setting, a reactive current of the second DC/DC converter so that a voltage between both ends of the DC-side capacitor coincides with a voltage of the first DC power supply or the load.

In this case, the second DC/DC converter to which a DC power supply or a load is not connected can be caused to perform switching operation at the same timing as the first DC/DC converter. Therefore, the switching operation period of the second DC/DC converter can be minimized.

(11) In the power conversion device of (1) to (10), the current command value setting for supplying a reactive current is to allocate some or all of terms depending on time that are included in a mathematical expression representing a current flowing through the intermediate bus.

By such current command value setting, it is possible to freely determine how to bear a reactive current by the first DC/DC converter and the second DC/DC converter.

(12) A control method aspect is a control method for a power conversion device that includes: a first DC/DC converter provided between a first DC power supply or a load, and an intermediate bus; a second DC/DC converter provided between a DC-side capacitor and the intermediate bus; an intermediate capacitor connected to the intermediate bus; a DC/AC converter provided between the intermediate bus and an AC grid; and a control unit configured to control the first DC/DC converter, the second DC/DC converter, and the DC/AC converter, the power conversion device being configured to perform DC/AC power conversion via the intermediate bus, the control method being executed by the control unit and including: making such current command value setting that mainly the second DC/DC converter supplies a reactive current flowing through the intermediate bus.

In such a control method for a power conversion device, mainly the second DC/DC converter is to take on the reactive current, and therefore, conversely, for the first DC/DC converter, the reactive current is reduced and mainly an active current can be caused to flow through the first DC/DC converter. Thus, the peak value of the current of the first DC/DC converter is reduced, conversion efficiency is enhanced, and further compactification can be achieved.

[Details of Embodiments]

Hereinafter, the details of embodiments will be described with reference to the drawings.

First, the basic configuration as a premise of a power conversion device using a minimum switching conversion method will be described.

<<Basic Configuration as Premise>>

FIG. 1 is a single-line connection diagram showing the schematic configuration of a power conversion device 50 connected to a photovoltaic panel 3P. In FIG. 1, the power conversion device 50 performs DC-to-AC power conversion, and includes a DC/DC converter 1 as a boost converter, and a DC/AC converter 8 as an inverter circuit connected thereto via an intermediate bus (DC bus) 6. The DC/DC converter 1 is provided, via a DC-side capacitor 4, between the photovoltaic panel 3P as a DC power supply and the intermediate bus 6. An intermediate capacitor 7 is connected to the intermediate bus 6. The DC/AC converter 8 is provided, via an AC-side capacitor 9, between the intermediate bus 6 and an AC grid.

The power conversion device 50 performs control according to the minimum switching conversion method, in which, while a voltage taken from the photovoltaic panel 3P and the absolute value of the instantaneous voltage on the AC side are always compared with each other, the DC/DC converter 1 is caused to perform switching operation during only a period in which step-up operation is needed, and the DC/AC converter 8 is caused to perform switching operation during only a period in which step-down operation is needed. In such control, a period in which switching operation is stopped is provided to each of the DC/DC converter 1 and the DC/AC converter 8. If the stop period is provided, switching loss and reactor iron loss are reduced accordingly, so that conversion efficiency improves.

By performing the above minimum switching conversion method, a pulsating current containing a reactive current as schematically shown by the waveform at the left in the drawing flows through the DC/DC converter 1. A current outputted from the power conversion device 50 to the AC grid has a sine waveform synchronized with a commercial power grid as shown by the waveform at the right in the drawing.

Figure 2:
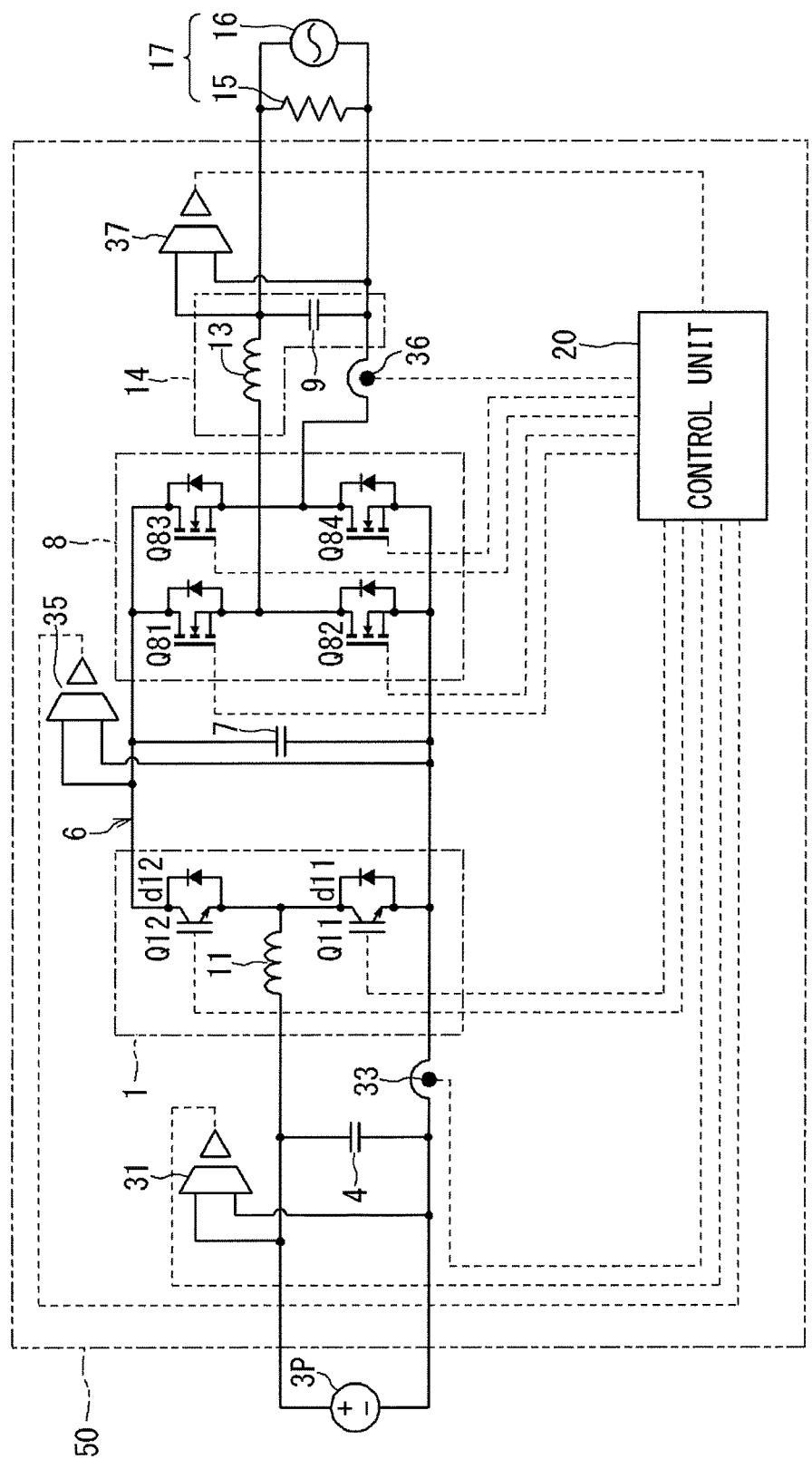
FIG. 2 is an example of a circuit diagram of the power conversion device shown in FIG. 1.

FIG. 2 is an example of a circuit diagram of the power conversion device 50 shown in FIG. 1. The parts corresponding to those in FIG. 1 are denoted by the same reference characters. In FIG. 2, the power conversion device 50 includes a filter circuit 14, a control unit 20, and measurement sensors described later, as well as the DC-side capacitor 4, the DC/DC converter 1, the intermediate capacitor 7, and the DC/AC converter 8 described above.

The DC/DC converter 1 is a step-up chopper (step-down is also possible) including a DC reactor 11 and a pair of switching elements Q11, Q12. As the switching elements Q11, Q12, for example, IGBTs (Insulated Gate Bipolar Transistors) are used. Diodes d11, d12 are respectively connected in parallel to the switching elements Q11, Q12, in opposite-polarity directions. It is noted that, other than the above, FETs (Field Effect Transistors) may be used as the switching elements Q11, Q12.

The DC/AC converter 8 includes four switching elements Q81, Q82, Q83, Q84 forming a full bridge.

The filter circuit 14 is composed of an AC reactor 13 and the AC-side capacitor 9, and prevents a high-frequency component contained in the AC output of the DC/AC converter 8 from leaking to the AC grid 17. The AC grid 17 includes an AC load 15 and a commercial power grid 16.

As the aforementioned sensors, provided are: a voltage sensor 31 for detecting a voltage ($V_g$) between both ends of the DC-side capacitor 4; a current sensor 33 for detecting a current ($I_{in}$) flowing through the DC/DC converter 1; a voltage sensor 35 for detecting a voltage between both ends of the intermediate capacitor 7, i.e., a voltage ($V_o$) between two lines of the intermediate bus 6; a current sensor 36 for detecting a current ($I_{inv}$) flowing on the AC side of the DC/AC converter 8; and a voltage sensor 37 for detecting a voltage between both ends of the AC-side capacitor 9. Measurement output signals from all the sensors are sent to the control unit 20. The control unit 20 performs switching control for the DC/DC converter 1 and the DC/AC converter 8.

The control unit 20, for example, includes a CPU and executes software (computer program) by a computer, thereby realizing necessary control functions. The software is stored in a storage device (not shown) of the control unit 20. It is noted that the control unit 20 may be configured from a circuit using only hardware not including a CPU.

<<First Example>>

Next, the power conversion device 50 according to an embodiment of the present invention will be described.

Figure 3:
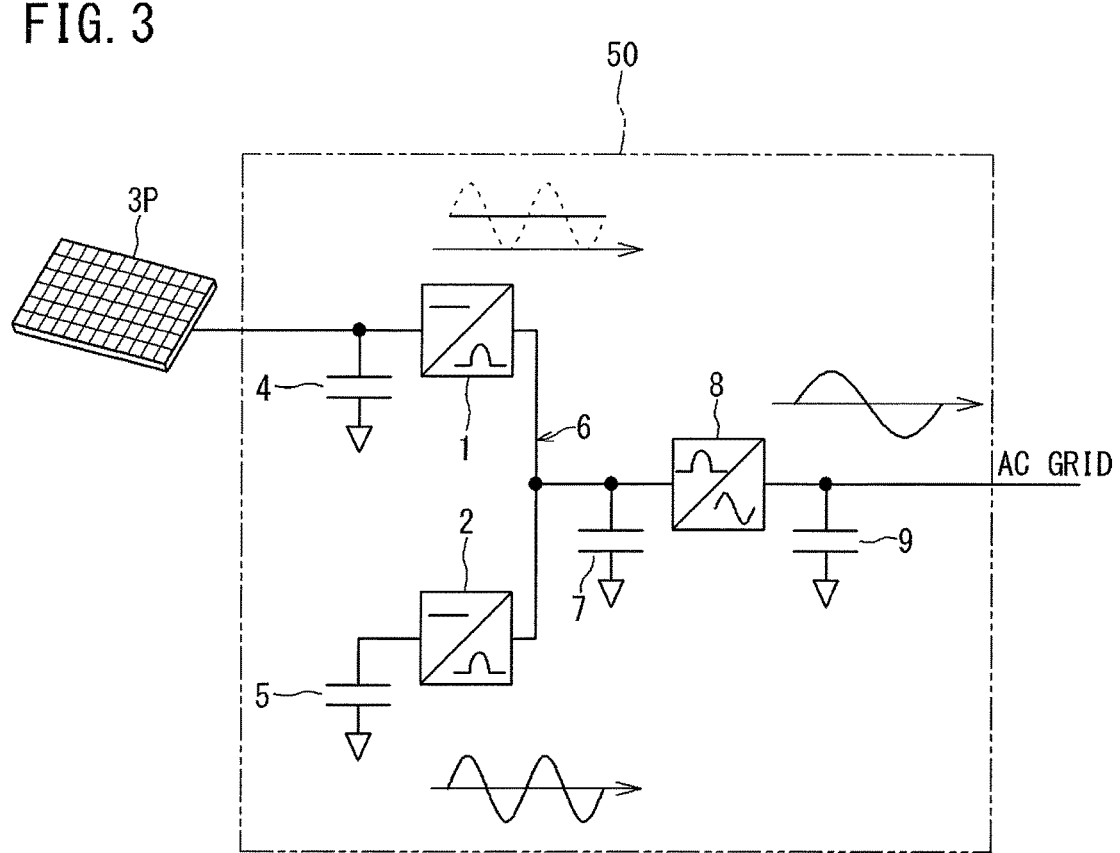
FIG. 3 is a single-line connection diagram showing the schematic configuration of a power conversion device connected to a photovoltaic panel.

FIG. 3 is a single-line connection diagram showing the schematic configuration of the power conversion device 50 connected to the photovoltaic panel 3P. The same parts as those in FIG. 1 are denoted by the same reference characters and the description thereof is omitted. The difference from FIG. 1 is that two systems are provided on the DC side of the intermediate bus 6.

In FIG. 3, separately from the first DC/DC converter 1, a second DC/DC converter 2 is provided between a DC-side capacitor 5 and the intermediate bus 6. A DC power supply is not connected to the second DC/DC converter 2.

Figure 4:
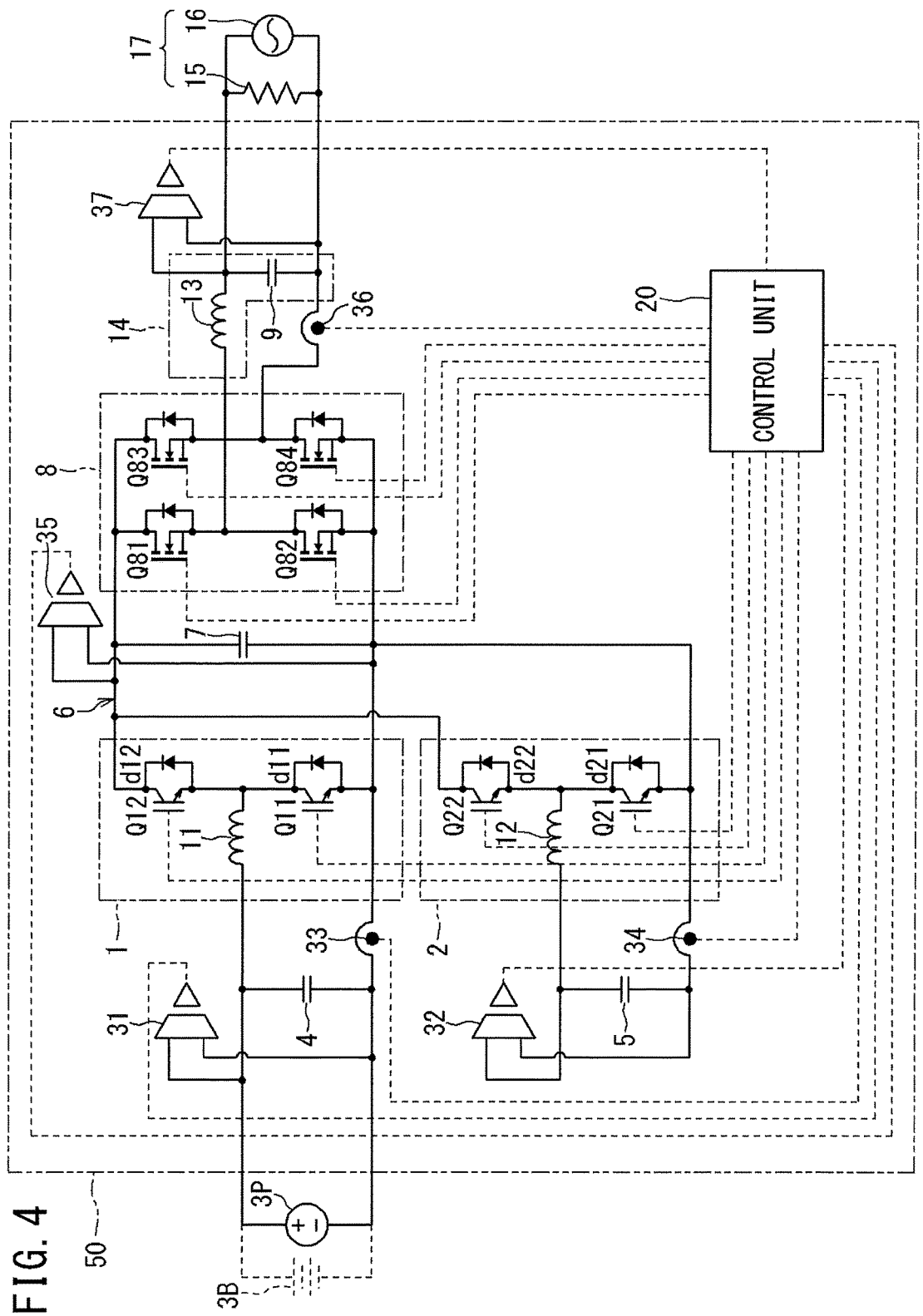
FIG. 4 is an example of a circuit diagram of the power conversion device shown in FIG. 3.

FIG. 4 is an example of a circuit diagram of the power conversion device 50 shown in FIG. 3. The parts corresponding to those in FIG. 2 and FIG. 3 are denoted by the same reference characters. In FIG. 4, the second DC/DC converter 2 is a step-up chopper (step-down is also possible) including a DC reactor 12 and a pair of switching elements Q21, Q22. As the switching elements Q21, Q22, for example, IGBTs are used. Diodes d21, d22 are respectively connected in parallel to the switching elements Q21, Q22, in opposite-polarity directions. It is noted that, other than the above, FETs may be used as the switching elements Q21, Q22. A voltage between both ends of the DC-side capacitor 5 is detected by a voltage sensor 32, and the measurement signal is sent to the control unit 20. A current flowing through the DC/DC converter 2 is detected by a current sensor 34, and the measurement signal is sent to the control unit 20.

If the aforementioned minimum switching conversion method control is expressed from electric power perspective in FIG. 4, the control unit 20 performs control so that the sum of a power passing through the first DC/DC converter 1 and a power passing through the second DC/DC converter 2 coincides with the sum of a reactive power for the intermediate capacitor 7 and a power arising on the AC side of the DC/AC converter 8.

That is, in this case, the power on the DC side as seen from the intermediate bus 6 coincides with the power on the AC side including the intermediate capacitor 7. In other words, the power on the DC side never becomes an excessive power greater than the power on the AC side. Therefore, the first DC/DC converter 1 and the second DC/DC converter 2 perform minimum necessary switching operations including the stop periods, and the DC/AC converter 8 performs minimum necessary switching operation including the stop period.

In addition, the control unit 20 performs control so that the sum of a power transferred to the AC grid 17 and a power of the AC-side capacitor 9 coincides with a power transferred between the AC reactor 13 and the DC/AC converter 8. Thus, powers can still be caused to coincide with each other even while considering the filter circuit 14. In other words, the control unit 20 performs control considering influence of the filter circuit 14.

In FIG. 3 and FIG. 4, the DC-side capacitor 5 serves as an element closing the terminal end circuit on the DC side. Of the current flowing through the intermediate bus 6, the first DC/DC converter 1 supplies an active current, and the second DC/DC converter 2 supplies a reactive current. The second DC/DC converter 2 in this case does not need to supply an active current, but exists only for supplying a reactive current. Such a configuration is a suitable circuit configuration for preventing the first DC/DC converter 1 from bearing a reactive current. In the first DC/DC converter 1 through which a reactive current does not flow, conversion efficiency can be enhanced as compared to a case where a reactive current flows therethrough. In addition, the peak value and the effective value of the current flowing through the first DC/DC converter 1 are reduced, whereby a smaller-sized configuration can be achieved.

It is noted that, in FIG. 4, the photovoltaic panel 3P may be replaced with the storage battery 3B. The storage battery 3B serves as a DC power supply when discharging, and serves as a load when being charged.

<<Control Theory>>

The power conversion device 50 performs the control according to the minimum switching conversion method by the control unit 20. Here, the theory of the minimum switching conversion method will be described. First, various values, including the aforementioned values, will be defined as follows.

$V_a$: an AC grid voltage detected by the voltage sensor 37

$I^*_a$: a command value for an AC current to flow to the AC grid 17

$I_{inv}$: an AC current detected by the current sensor 36

$C_a$: the capacitance of the AC-side capacitor 9

$I^*_{inv}$: a command value for a current to flow from the DC/AC converter 8 to the AC reactor 13

$V^*_{inv}$: a voltage command value for the AC side of the DC/AC converter 8

$R^*_{inv}$: a resistance component of the DC/AC converter 8

$L_{inv}$: the inductance of the AC reactor 13

$I^*_{in}$: a command value for a current to flow to the DC reactor 11 (12) of the DC/DC converter 1 (2)

$I_{in}$: a DC current detected by the current sensor 33 (34)

$C_o$: the capacitance of the intermediate capacitor 7

$V^*_o$: a command value for a voltage to arise between both ends of the intermediate capacitor 7

$V_o$: an intermediate voltage detected by the voltage sensor 35

$V_g$: a DC voltage detected by the voltage sensor 31

$R^*_{in}$: a resistance component of the DC/DC converter 1 (2)

$L_{inv}$: the inductance of the DC reactor 11 (12)

Among the above various values, values that vary depending on time t are represented as functions of time in the following expressions. It is noted that, in the following, there is no meaning in difference of character font (upright/italic), and the same character represents the same value (the same applies hereinafter).

First, the current command value $I^*_{inv}$ for the DC/AC converter 8 is represented as follows.

$$I^*_{inv}(t) = I^*_a(t) + C_a \frac{dV_a(t)}{dt} \quad (1)$$

The voltage command value $V^*_{inv}$ for the DC/AC converter 8 is represented as follows.

$$V^*_{inv}(t) = V^*_a(t) - \left(R_{inv}I^*_{inv}(t) + L_{inv}\frac{dI^*_{inv}(t)}{dt}\right) \quad (2)$$

The current command value $I^*_{in}$ for the DC/DC converter 1 (2) is represented as follows.

$$I^*_{in}(t) = \frac{I^*_{inv}(t)V^*_{inv}(t) + C_o\frac{dV^*_o(t)}{dt}V^*_o(t)}{V_g - \left(R_{in}I^*_{in}(t) + L_{in}\frac{dI^*_{in}(t)}{dt}\right)} \quad (3)$$

A voltage drop of the DC power supply voltage in the DC/DC converter 1 (2) and a reactive current flowing through the intermediate capacitor 7 are small. Therefore, by ignoring these, the following expression (4) is obtained.

$$I^*_{in}(t) \approx \frac{I^*_{inv}(t)V^*_{inv}(t)}{V_g} \quad (4)$$

Next, if $I^*_{inv}$ and $V^*_{inv}$ are sine waves completely synchronized with each other, the following expression (5) is obtained. Here, $\omega$ is $2\pi f$ when the frequency of the AC grid is f.

$$I^*_{in}(t) = \frac{I^*_{inv}V^*_{inv}\sin^2(\omega t)}{V_g} \quad (5)$$

In the expression (5), $I^*_{inv}$ and $V^*_{inv}$ without time (t) represent the amplitudes of the sine waves. Expression (5) can be further deformed into the following expression (6).

$$I^*_{in}(t) = \frac{I^*_{inv}V^*_{inv}}{2V_g}[1 - \cos(2\omega t)] \quad (6)$$

The first term in expression (6) is a constant value not depending on time, and is an active current. That is, expression (7) representing an active current $I^*_{in\_a}$ is as follows.

$$I^*_{in\_a} = \frac{I^*_{inv}V^*_{inv}}{2V_g} = \frac{\langle I^*_{inv}\rangle_{rms}\langle V^*_{inv}\rangle_{rms}}{V_g} = \sum_i^n \frac{I^*_{inv\_i}V^*_{inv}}{2V_g} \quad (7)$$

Here, a notation "$\langle\ \rangle$" indicates an average value of a value in the brackets. In addition, the subscript of $I^*_{inv\_i}$ represents, for example, the current command value for the DC/DC converter 1 as $I^*_{inv\_1}$, and the current command value for the DC/DC converter 2 as $I^*_{inv\_2}$.

As shown by expression (7), the active current is equal to a value obtained by dividing the effective values of $I^*_{inv}$ and $V^*_{inv}$ by the DC input voltage Vg, and in a case where there are a plurality of DC/DC converters, the active current can be represented using linear combination of currents $I^*_{inv\_i}$ for the respective converters.

On the other hand, the second term in expression (6) is a reactive current having a frequency twice as high as the AC frequency. That is, expression (8) representing a reactive current $I^*_{in\_r}(t)$ is as follows.

$$I^*_{in\_r}(t) = -\frac{I^*_{inv}V^*_{inv}\cos(2\omega t)}{2V_g} \quad (8)$$

The effective value of the reactive current is the square root (rms) of mean square of expression (8), and is represented by the following expression (9).

$$\langle I^*_{in\_r}\rangle_{rms} = \frac{I^*_{inv}V^*_{inv}}{2\sqrt{2}\,V_g} = \frac{I^*_{in\_a}}{\sqrt{2}} \quad (9)$$

This is $(1/\sqrt{2})$ times the active current.

The effective value of a current is represented by the following expression (10).

$$\langle I^*_{in}\rangle_{rms} = \sqrt{3/2}\cdot\frac{I^*_{inv}V^*_{inv}}{2V_g} = \sqrt{3/2}\cdot I^*_{in\_a} \quad (10)$$

This is $(3/2)^{1/2}$ times the active current.

From the above analysis, if the current command value for the DC/DC converter 2 for supplying a reactive current is set as expression (8) to supply a reactive current to the intermediate bus 6, the DC/DC converter 1 can supply only an active current with the current command value therefor set as expression (7). Thus, as compared to the configuration in FIG. 1, the peak value of the current of the DC/DC converter 1 is halved. Further, since a low-frequency pulsating current no longer flows through the DC/DC converter 1, the capacitance of the DC-side capacitor 4 can be reduced.

The description thus far has been made on the basis of expression (4) in which voltage drops in the DC/DC converters 1, 2 and a reactive current in the intermediate capacitor 7 are omitted, for simplification purpose. In practice, it is desirable to perform control based on expression (3) without such omission. Accordingly, expression (3) can be replaced with the expression (11) adapted to a case where a plurality of DC/DC converters 1, 2 are provided in parallel as shown in FIG. 3 and FIG. 4.

$$I_{in\_i}^*(t) = \frac{I_{inv\_i}^*(t)V_{inv}^*(t) + C_{o\_i}\frac{dV_o^*(t)}{dt}V_o^*(t)}{V_{g\_i} - \left(R_{in\_i}I_{in\_i}^*(t) + L_{in\_i}\frac{dI_{in\_i}^*(t)}{dt}\right)} \quad (11)$$

In expression (11), in association with the respective systems on the DC side of the intermediate bus 6, the subscript "i" is i=1, 2, or may be n equal to or greater than 3, and in this case, i=1 to n. The current command value $I^*_{inv}$ for the DC/AC converter 8 becomes $I^*_{inv\_i}$ by being divided so as to correspond to the plurality of DC/DC converters. Similarly, the capacitance of the intermediate capacitor 7 becomes $C_{o\_i}$ by being divided so as to correspond to the plurality of DC/DC converters.

Next, the procedure for determining the current command values for the DC/DC converter 1 and the DC/DC converter 2 will be described. First, as shown by the following expression (12), the current command value $I^*_{in1}$ for the DC/DC converter 1 calculated by expression (11) is averaged over a cycle T (half the cycle of AC output from the DC/AC converter 8) of an AC component, thereby obtaining an active current component $I^*_{in1\_a}$ thereof.

$$I_{in1\_a}^* = \frac{1}{T}\int_t^{t+T} I_{in1}^* dt \quad (12)$$

Next, a reactive current component is calculated by the following expression (13).

$$I_{in1\_r}^* = I_{in1}^* - I_{in1\_a}^* \quad (13)$$

A current command value $I^*_{inm1}$ for the DC/DC converter 1, in which the reactive current component is reduced, can be calculated by the following expression (14), with u set as a value of 0 to 1.

$$I_{inm1}^* = I_{in1}^* - uI_{in1\_r}^* \quad (14)$$

When the value of u is 1, $I^*_{inm1}$ becomes equal to $I^*_{in1\_a}$, and the reactive current component is completely eliminated from the current command value for the DC/DC converter 1, so that only an active current remains.

On the other hand, a current command value $I^*_{inm2}$ for the DC/DC converter 2 to bear the reactive current is obtained by adding $u \cdot I^*_{in1\_r}$ to $I^*_{in2}$ calculated by expression (11), as shown by the following expression (15).

$$I_{inm2}^* = I_{in2}^* + uI_{in1\_r}^* \quad (15)$$

When a DC power supply is not connected to the DC/DC converter 2, $I^*_{in2}$ becomes 0. Further, when the value of u is 1, $I^*_{inm2}$ becomes $I^*_{in1\_r}$, so that only the DC/DC converter 1 supplies a reactive current component. The value of u is determined in consideration of the size, cost, conversion efficiency, and the like of the power conversion device 50. In addition, the value of u may be changed depending on the operation condition.

In any case, by expressions (14), (15), mainly the DC/DC converter 2 is to supply a reactive current flowing through the intermediate bus 6.

That is, in such a power conversion device 50, mainly the DC/DC converter 2 is to take on the reactive current, and therefore, conversely, the DC/DC converter 1 can mainly supply an active current while a reactive current is reduced. Thus, the peak value of the current of the DC/DC converter 1 is reduced, conversion efficiency is enhanced, and further compactification can be achieved.

In addition, if the DC/DC converter 2 is caused to bear the entire reactive current, only an active current flows through the DC/DC converter 1. Thus, the peak value of the DC/DC converter 1 is maximally reduced, conversion efficiency is enhanced, and compactification can be achieved.

In addition, it is also possible to control reactive currents flowing through the DC/DC converter 1 and the DC/DC converter 2 so that the peak values of currents flowing through the DC/DC converter 1 and the DC/DC converter 2 are minimized. In this case, the current capacities of the switching elements Q11, Q12, Q21, Q22 and the DC reactors 11, 12 of the respective converters can be minimized, whereby the power conversion device 50 can be downsized.

In addition, it is also possible to control reactive currents flowing through the DC/DC converter 1 and the DC/DC converter 2 so that the mean squares of currents flowing through the DC/DC converter 1 and the DC/DC converter 2 are minimized. In this case, resistance losses occurring in the DC/DC converter 1 and the DC/DC converter 2 can be minimized, whereby the efficiency of the power conversion device 50 can be enhanced.

It is preferable that the control unit 20 controls the reactive current of the DC/DC converter 2 so that the voltage between both ends of the DC-side capacitor 5 coincides with the voltage of the DC power supply, i.e., the voltage of the DC-side capacitor 4.

In this case, the DC/DC converter 2 to which a DC power supply is not connected can be caused to perform switching operation at the same timing as the DC/DC converter 1. Therefore, the switching operation period of the DC/DC converter 2 can be minimized.

<<Second Example>>

Figure 5:
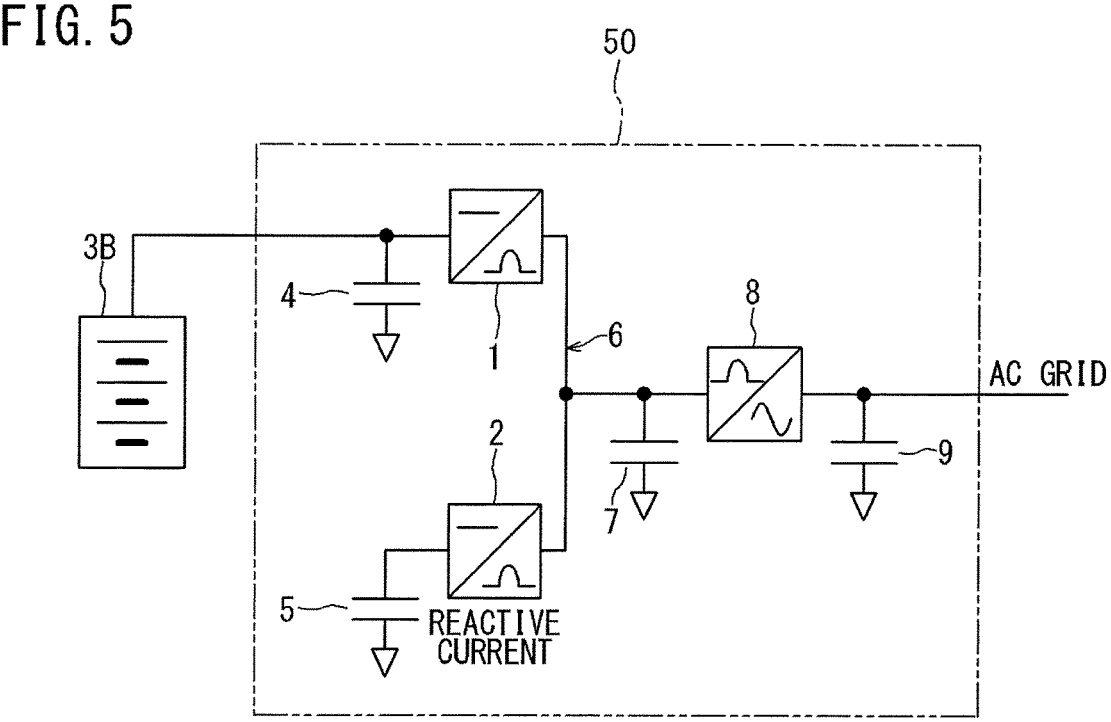
FIG. 5 is a single-line connection diagram showing the schematic configuration of a power conversion device connected to a storage battery.

FIG. 5 is a single-line connection diagram showing the schematic configuration of the power conversion device 50 connected to the storage battery 3B. The difference from FIG. 3 is that, instead of the photovoltaic panel, the storage battery 3B is connected to the DC/DC converter 1.

In this case, reactive currents flowing through the DC/DC converter 1 and the DC/DC converter 2 are controlled so that the reactive current flowing through the DC/DC converter 1 becomes zero. Thus, a reactive current can be prevented from flowing through the storage battery 3B.

<<Third Example>>

Figure 6:
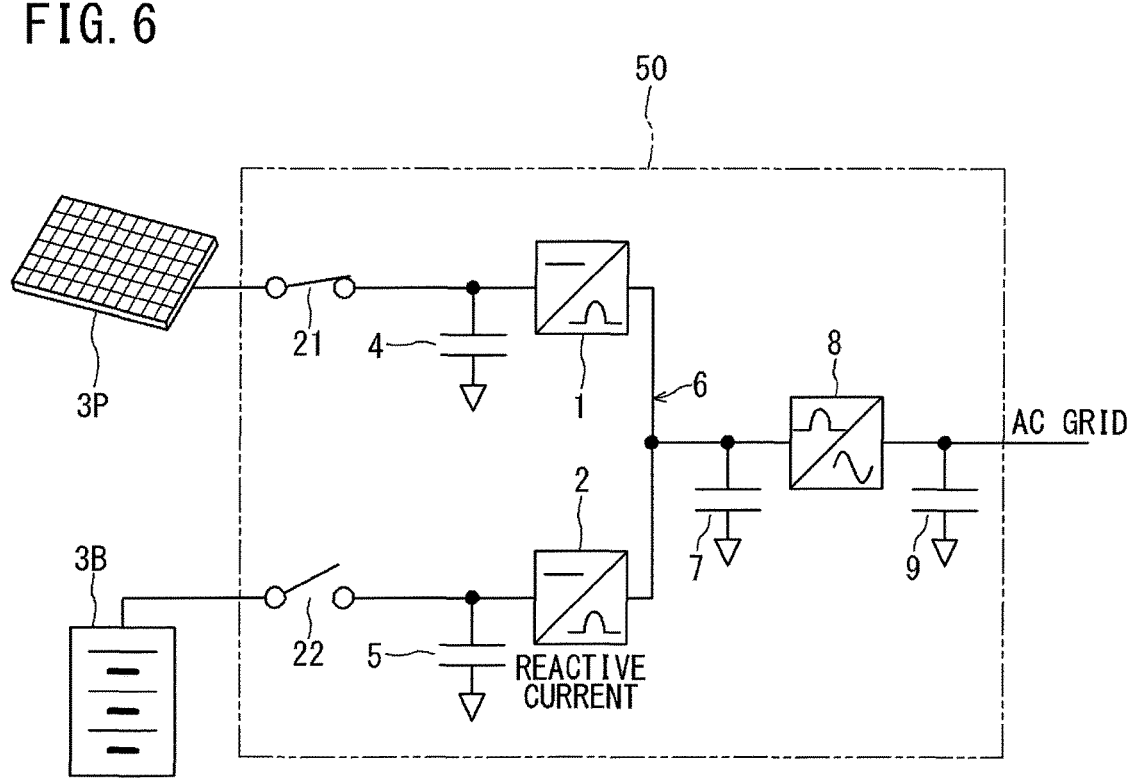
FIG. 6 is a single-line connection diagram showing the schematic configuration of a power conversion device connected to a photovoltaic panel and a storage battery.

FIG. 6 is a single-line connection diagram showing the schematic configuration of the power conversion device 50 connected to the photovoltaic panel 3P and the storage battery 3B. The differences from FIG. 3 are that, in a system separate from the photovoltaic panel 3P, the storage battery 3B is connected to the DC/DC converter 2 and that switches 21, 22 are provided. The switch 21 is provided between the photovoltaic panel 3P and the DC/DC converter 1. The switch 22 is provided between the storage battery 3B and the DC/DC converter 2.

Figure 7:
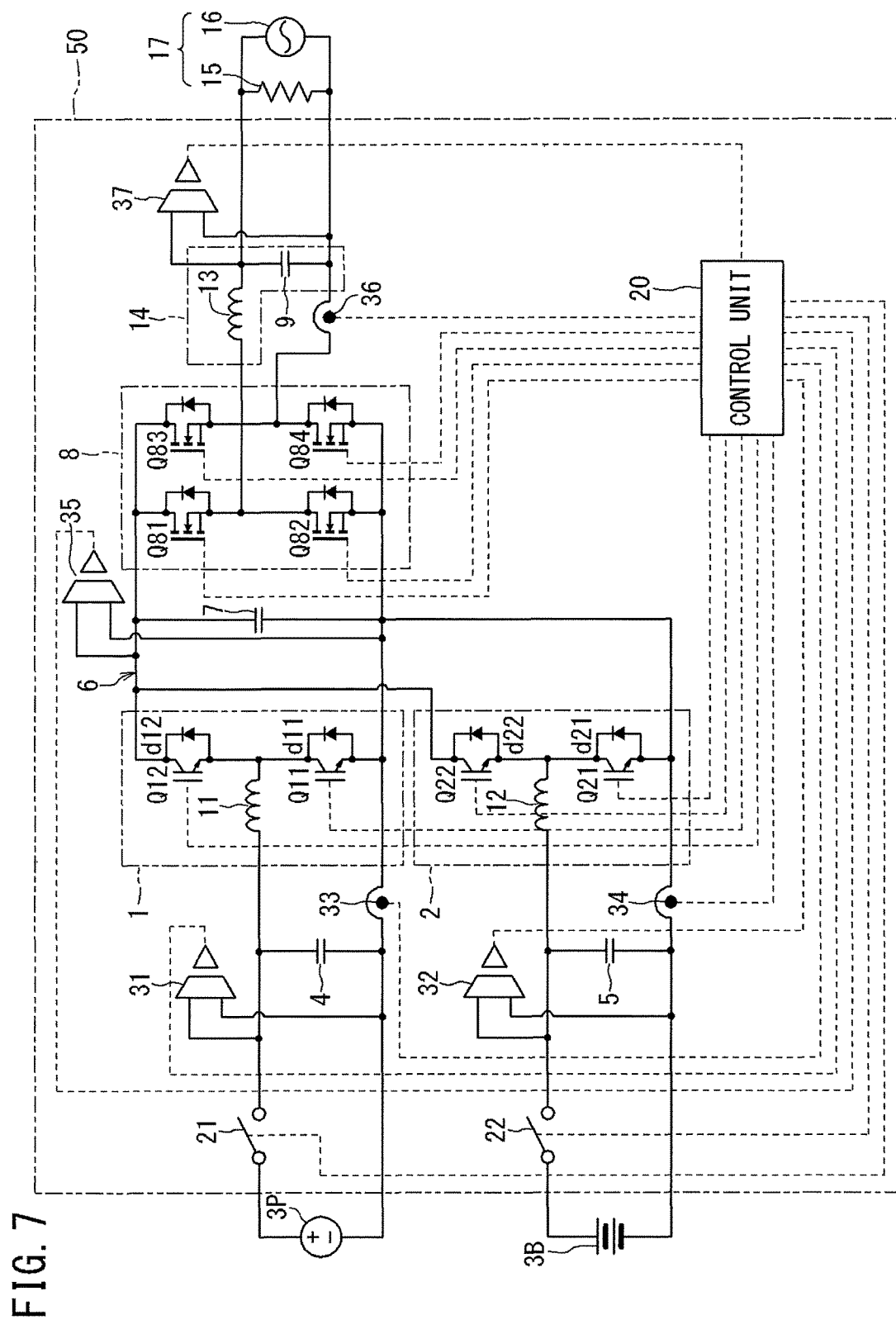
FIG. 7 is an example of a circuit diagram of the power conversion device corresponding to FIG. 6.

FIG. 7 is an example of a circuit diagram of the power conversion device 50 corresponding to FIG. 6. The differences from FIG. 4 are that the switches 21, 22 are provided and that the storage battery 3B is connected to the DC/DC converter 2. The switches 21, 22 can be opened or closed by the control unit 20. As the switches 21, 22, for example, relay contacts may be used.

Returning to FIG. 6, in a case where the photovoltaic panel 3P is generating a power and the storage battery 3B is not in operation, the switch 21 is closed and the switch 22 is opened. In this case, the DC/DC converter 2 can be used for supplying a reactive current. By causing a reactive current to flow through the DC/DC converter 2 without causing the reactive current to flow to the storage battery 3B, the peak values of currents flowing through the DC/DC converters 1, 2 or the mean squares of these currents can be minimized.

<<Fourth Example>>

Figure 8:
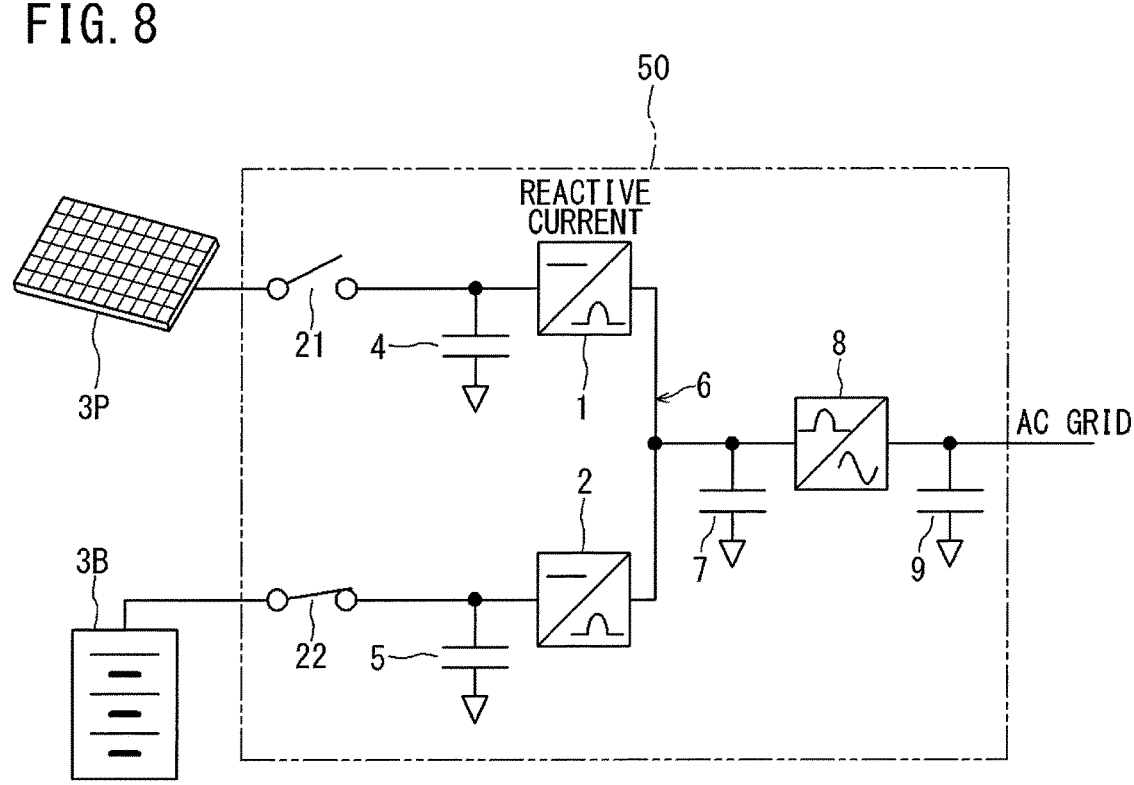
FIG. 8 is a single-line connection diagram showing the schematic configuration of a power conversion device connected to a photovoltaic panel and a storage battery.

FIG. 8 is a single-line connection diagram showing the schematic configuration of the power conversion device 50 connected to the photovoltaic panel 3P and the storage battery 3B. The difference from FIG. 6 is that the open/close states of the switches 21, 22 are reversed. In a case where the photovoltaic panel 3P is not generating a power, for example, during the night and the storage battery 3B is being charged or discharged, the switch 21 is opened and the switch 22 is closed as shown in the drawing. Thus, the solar battery is prevented from being energized by the voltage of the DC-side capacitor 4 and at the same time, a reactive current is caused to flow through the DC/DC converter 1, whereby a reactive current can be prevented from flowing through the DC/DC converter 2 and the storage battery 3B.

<<Fifth Example>>

Figure 9:
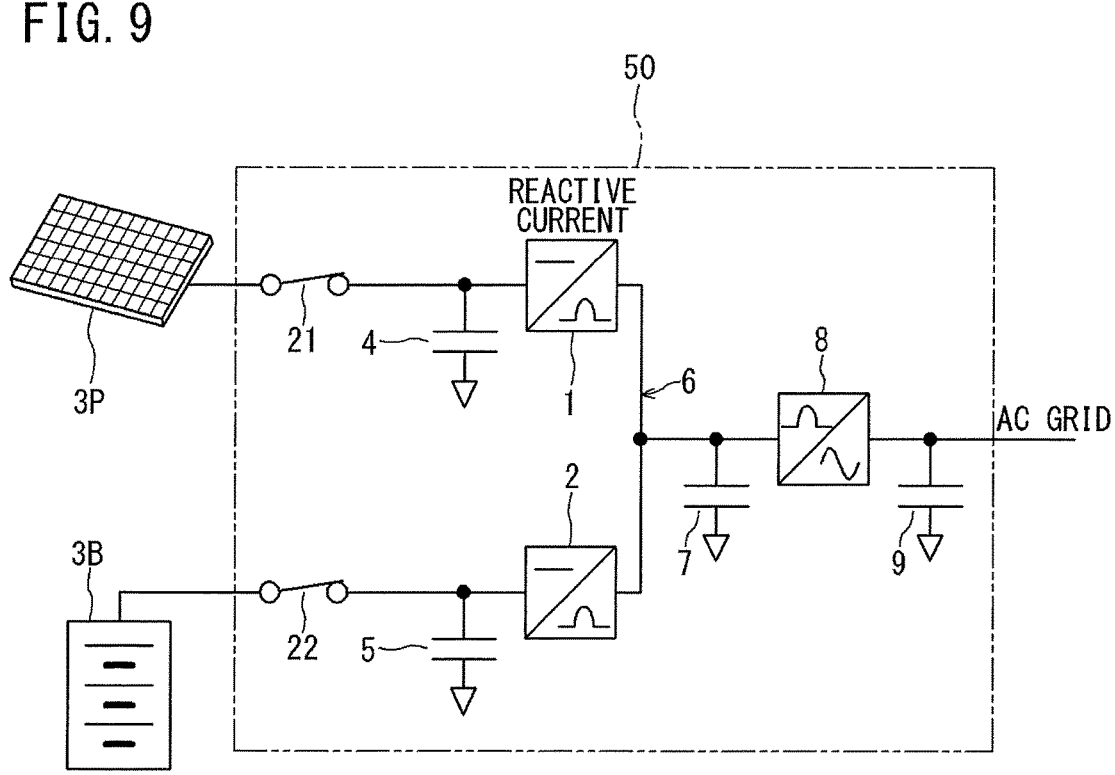
FIG. 9 is a single-line connection diagram showing the schematic configuration of a power conversion device connected to a photovoltaic panel and a storage battery.

FIG. 9 is a single-line connection diagram showing the schematic configuration of the power conversion device 50 connected to the photovoltaic panel 3P and the storage battery 3B. The difference from FIG. 6 and FIG. 8 is that both switches 21, 22 are closed. In a case where the photovoltaic panel 3P is generating a power and the storage battery 3B is being charged or discharged, both switches 21, 22 are closed as shown in the drawing. Then, a reactive current of the DC/DC converter 1 is controlled so that a reactive current flowing through the DC/DC converter 2 becomes zero. Thus, a reactive current can be prevented from flowing through the storage battery 3B.

It is noted that, in a case where the photovoltaic panel 3P is generating a power and the storage battery 3B is being charged, reactive currents flowing through the DC/DC converter 1 and the DC/DC converter 2 are cancelled with each other, so that the peak values of currents flowing through the respective converter 1, 2 are reduced. Therefore, when the photovoltaic panel 3P is generating a power, if only charging is performed for the storage battery 3B without performing discharging, the current capacities of the DC/DC converter 1 and the DC/DC converter 2 can be reduced. Thus, the size and the weight of the power conversion device 50 can be reduced.

It is noted that the first to fifth examples may be, at least partially, optionally combined with each other. In addition, the number of systems on the DC side is not limited to two, but may be three or more.

<<Regarding Third to Fifth Examples>>

As shown in the third to fifth examples, when the switch 22 is opened, the DC/DC converter 2 can be used only for supplying a reactive current, and when the switch 22 is closed, the DC/DC converter 2 can supply not only a reactive current but also an active current.

Also for the DC/DC converter 1, similarly, when the switch 21 is opened, the DC/DC converter 1 can be used only for supplying a reactive current, and when the switch 21 is closed, the DC/DC converter 1 can supply not only a reactive current but also an active current.

<<Bidirectional Property>>

In the above examples, the power conversion device 50 has been described as a device for performing DC-to-AC power conversion. However, on the basis of the same control theory, reverse-direction power conversion is also applicable by changing signs as appropriate considering the current direction.

<<Verification>>

Next, operation of the power conversion device 50 (FIG. 6, FIG. 8, or FIG. 9) with the photovoltaic panel 3P and the storage battery 3B connected in two systems on the DC side will be verified under various conditions.

In each of FIG. 10 to FIG. 21, waveforms at the first to fifth stages from the top represent the following.

<First stage> AC current command value $I^*_a$ [A], AC current $I_a$ [A], $I_a$ [A] that has passed through a low-pass filter <Second stage> Current command value $I^*_{in1}$ [A] for the DC reactor 11, DC current $I_{in1}$ [A], on the side where the photovoltaic panel 3P is connected <Third stage> Current command value $I^*_{in2}$ [A] for the DC reactor 11, DC current $I_{in2}$ [A], on the side where the storage battery 3B is connected <Fourth stage> Voltage command value $V^*_o$ [V] for the intermediate bus 6, intermediate voltage $V_o$ [V], DC voltage $V_g$ [V] of the photovoltaic panel 3P <Fifth stage> Among the upper, middle, and lower waveforms, the upper one is a gate pulse of the switching element Q81, Q84, the middle one is a gate pulse of the switching element Q11 (low side) of the DC/DC converter 1, and the lower one is a gate pulse of the switching element Q21 (low side) of the DC/DC converter 2.

(Verification Example 1: Generated Power 0 kW, Charge Power 2 kW, Received Power 2 kW)

Figure 10:
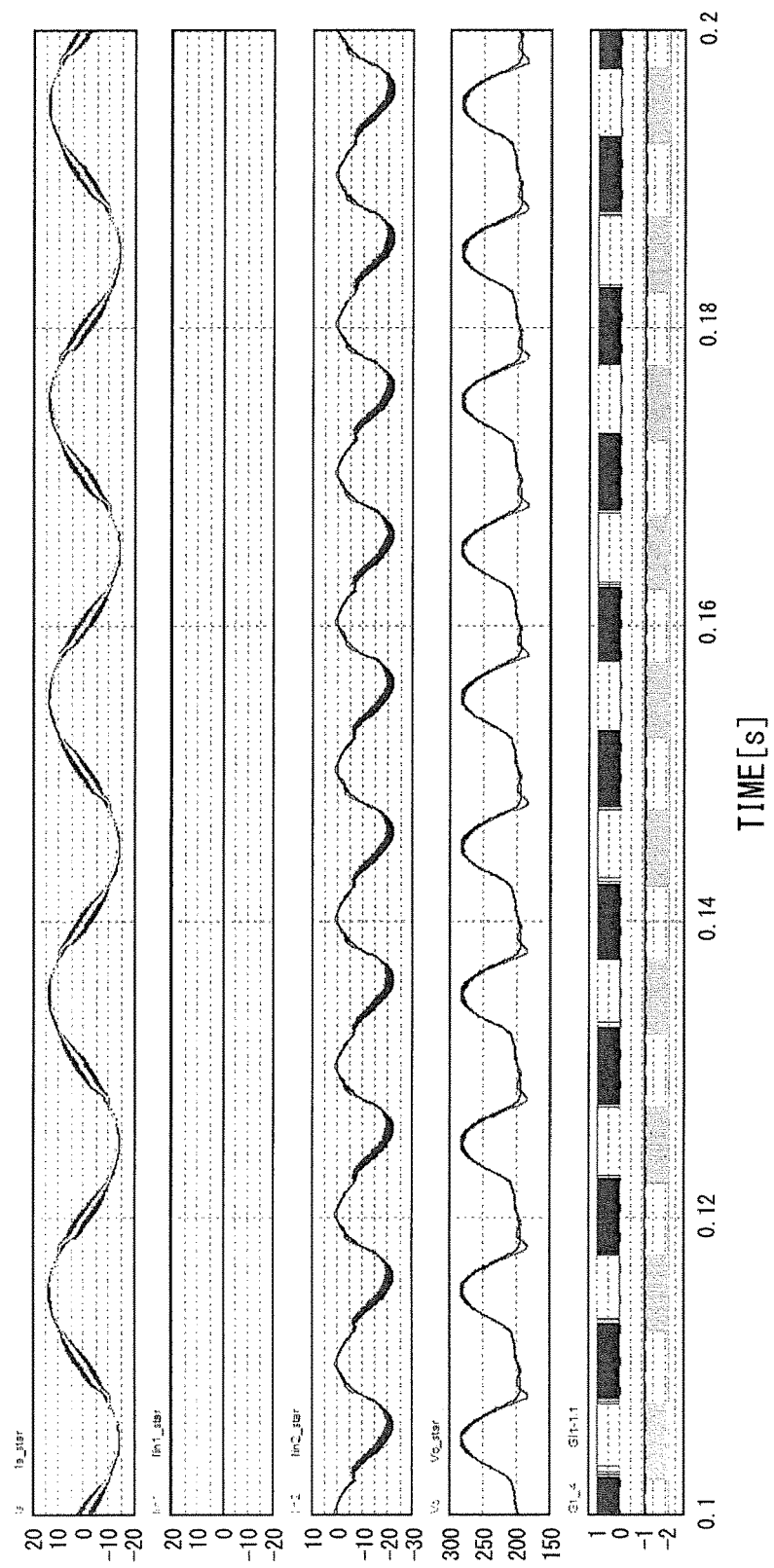
FIG. 10 is a waveform diagram of the power conversion device that is charging the storage battery in a state in which there is no power generated by the photovoltaic panel (including a case where no photovoltaic panel is connected), in verification example 1 (before current smoothing).
Figure 11:
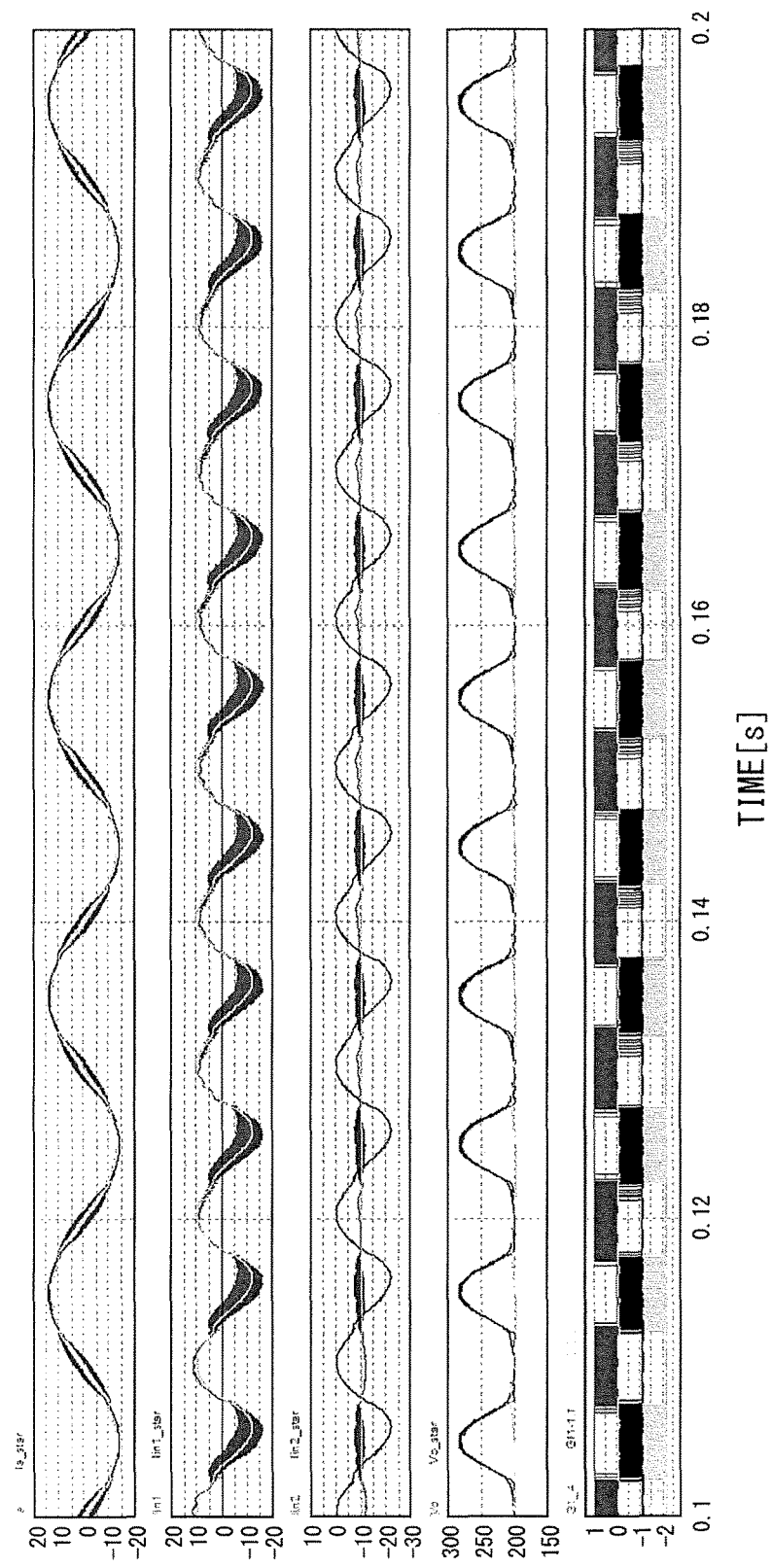
FIG. 11 is a waveform diagram of the power conversion device that is charging the storage battery in a state in which there is no power generated by the photovoltaic panel (including a case where no photovoltaic panel is connected), in verification example 1 (after current smoothing).

FIG. 10 and FIG. 11 are waveform diagrams of the power conversion device 50 that is charging the storage battery 3B in a state in which there is no power generated by the photovoltaic panel 3P (including a case where the photovoltaic panel 3P is not connected). That is, the generated power is 0 kW. In addition, here, the charge power is 2 kW, the received power from the AC grid 17 is 2 kW, and the voltage of the storage battery 3B is 200 V. FIG. 10 shows a case of not performing the above control relevant to reactive current, and FIG. 11 shows a case of performing the control.

If a reactive current that would flow through the DC/DC converter 2 is borne by the DC/DC converter 1 which receives no output from the photovoltaic panel 3P, the current of the DC/DC converter 2 is smoothed (flat line at the third stage in FIG. 11). At this time, if control is performed so that the voltage of the DC-side capacitor 4 of the DC/DC converter 1 keeps 200 V which is the same as that of the storage battery 3B, the switching period of the DC/DC converter 2 hardly varies, and the condition in which the DC/DC converter 2 stops switching during the period in which the DC/AC converter 8 performs switching, is kept. Switching of the DC/DC converter 1 is also performed during the same period as the DC/DC converter 2, and is stopped during the period in which the DC/AC converter 8 operates.

The AC current $I_a$ and a total harmonic distortion (THD) before current smoothing (FIG. 10) and after current smoothing (FIG. 11) are as follows.

Before current smoothing (FIG. 10) $I_a$: 9.53 Arms, THD: 6.0%

After current smoothing (FIG. 11) $I_a$: 9.46 Arms, THD: 5.2%

It is noted that THD is calculated from a waveform that has passed through a low-pass filter having a cut-off frequency of 5 kHz, in order to eliminate a ripple of a switching frequency of 15 kHz or higher.

(Verification Example 2: Generated Power 0 kW, Discharge Power 2 kW, Reverse-Flow Power 2 kW)

Figure 12:
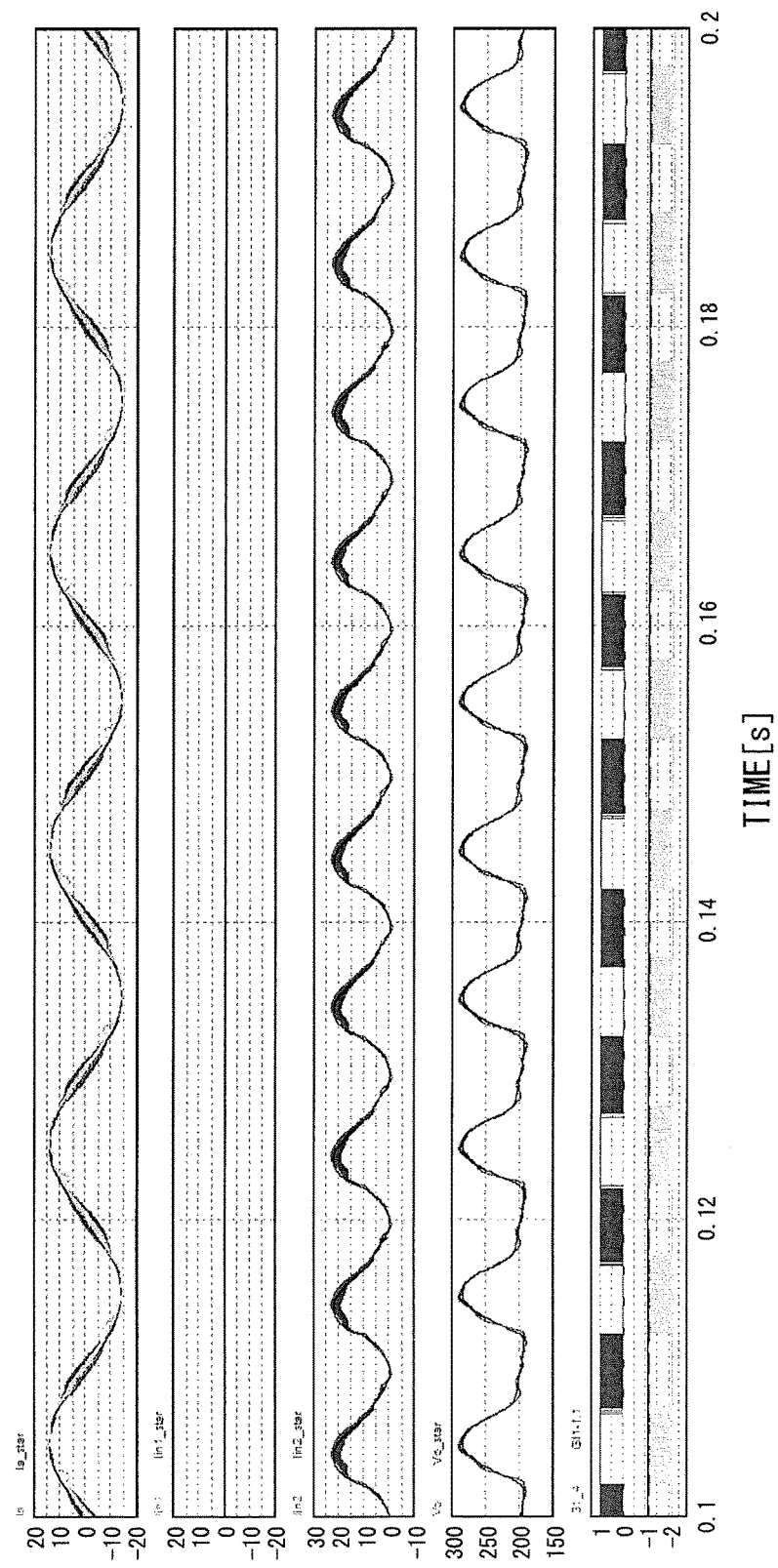
FIG. 12 is a waveform diagram of the power conversion device that is discharging the storage battery in a state in which there is no power generated by the photovoltaic panel (including a case where no photovoltaic panel is connected), in verification example 2 (before current smoothing).
Figure 13:
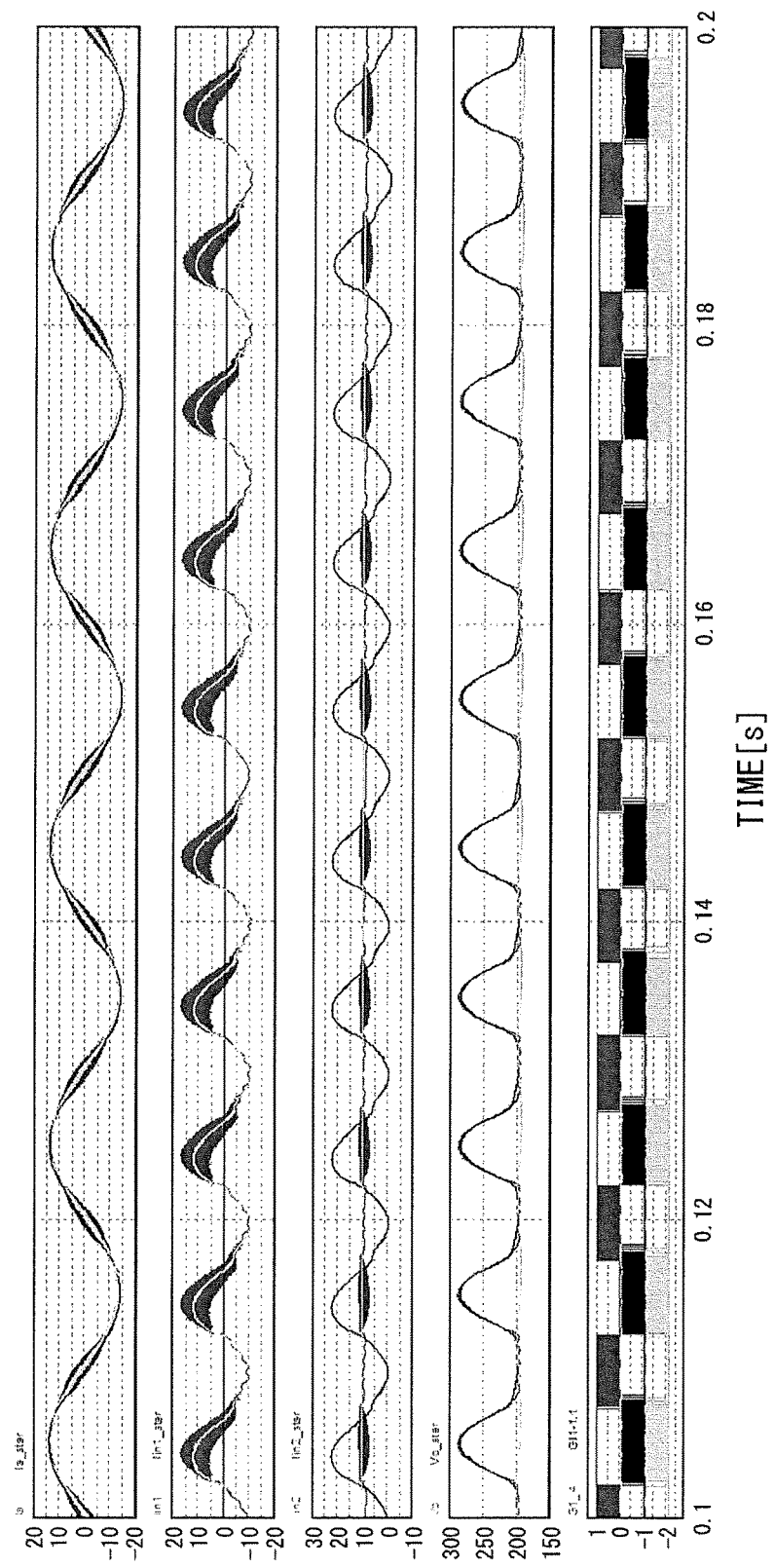
FIG. 13 is a waveform diagram of the power conversion device that is discharging the storage battery in a state in which there is no power generated by the photovoltaic panel (including a case where no photovoltaic panel is connected), in verification example 2 (after current smoothing).

FIG. 12 and FIG. 13 are waveform diagrams of the power conversion device 50 that is discharging the storage battery 3B in a state in which there is no power generated by the photovoltaic panel 3P (including a case where the photovoltaic panel 3P is not connected). The voltage of the storage battery 3B is 200 V, and the discharge power is 2 kW. FIG. 12 shows a case of not performing the control relevant to reactive current, and FIG. 13 shows a case of performing the control.

The AC current $I_a$ and the total harmonic distortion THD before current smoothing (FIG. 12) and after current smoothing (FIG. 13) are as follows.

Before current smoothing (FIG. 12) $I_a$: 9.75 Arms, THD: 9.4%

After current smoothing (FIG. 13) $I_a$: 9.49 Arms, THD: 4.0%

In this case, the DC/DC converter 1 is caused to bear a reactive current, and the voltage of the DC-side capacitor 4 of the DC/DC converter 1 is controlled to keep 200 V which is the same as that of the storage battery 3B. Also in this case, the switching period of the DC/DC converter 2 hardly varies by the smoothing, and the condition in which the DC/DC converter 2 stops switching during the period in which the DC/AC converter 8 performs switching, is kept. Switching of the DC/DC converter 1 is also performed during the same period as the DC/DC converter 2, and is stopped during the period in which the DC/AC converter 8 operates. At a stage before smoothing, dip occurs on the AC current immediately after shifting from the switching period of the DC/AC converter 8 to the switching period of the DC/DC converters 1, 2, and therefore the total harmonic distortion is as great as 9.4%. On the other hand, by the smoothing, dip of the AC current is eliminated and the total harmonic distortion reduces to 4.0%.

(Verification Example 3: Generated Power 6 kW, Charge Power 2 kW, Reverse-Flow Power 4 kW)

Figure 14:
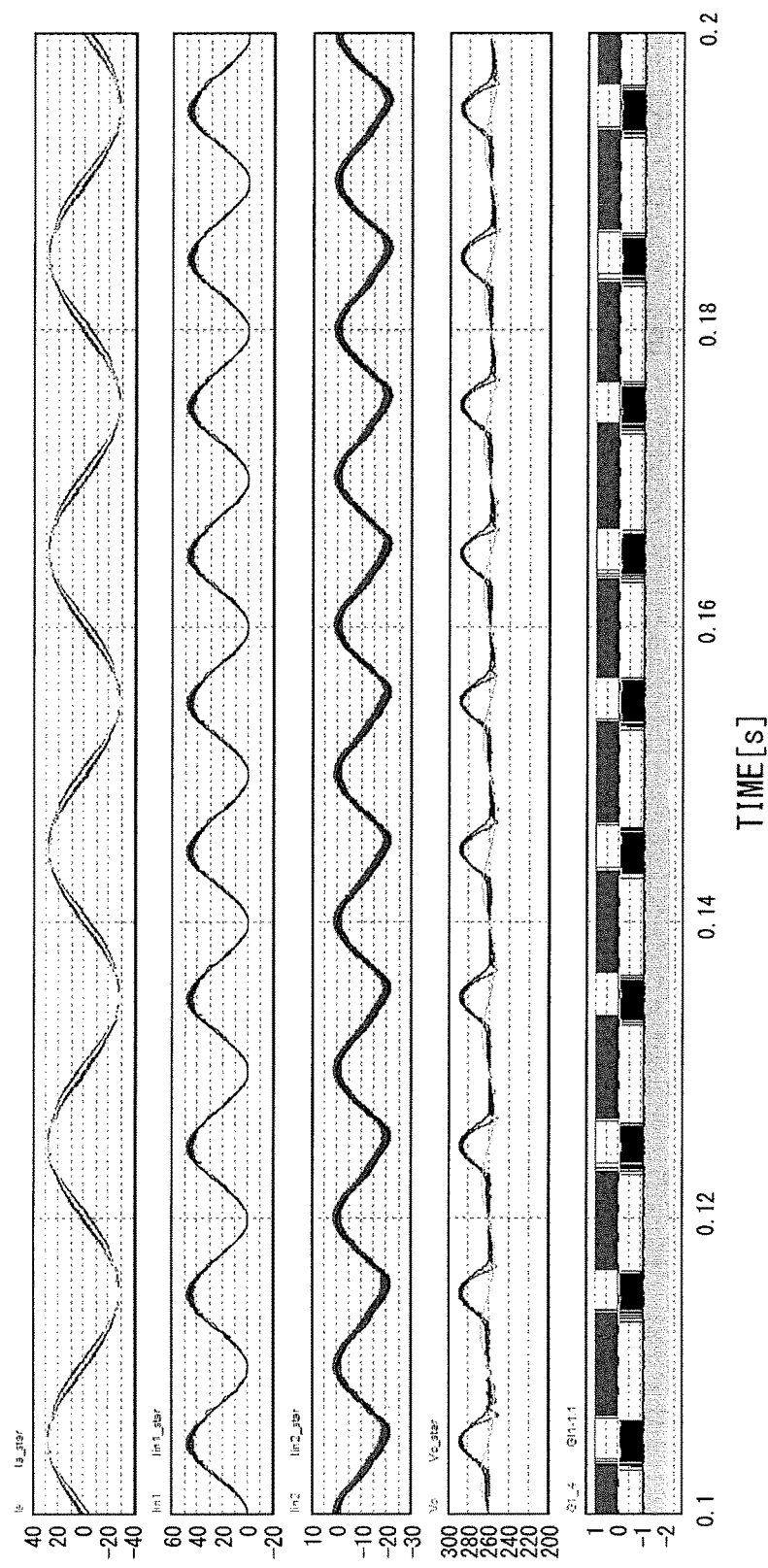
FIG. 14 is a waveform diagram of the power conversion device that is charging the storage battery in a state in which there is a power generated by the photovoltaic panel, in verification example 3 (before current smoothing).
Figure 15:
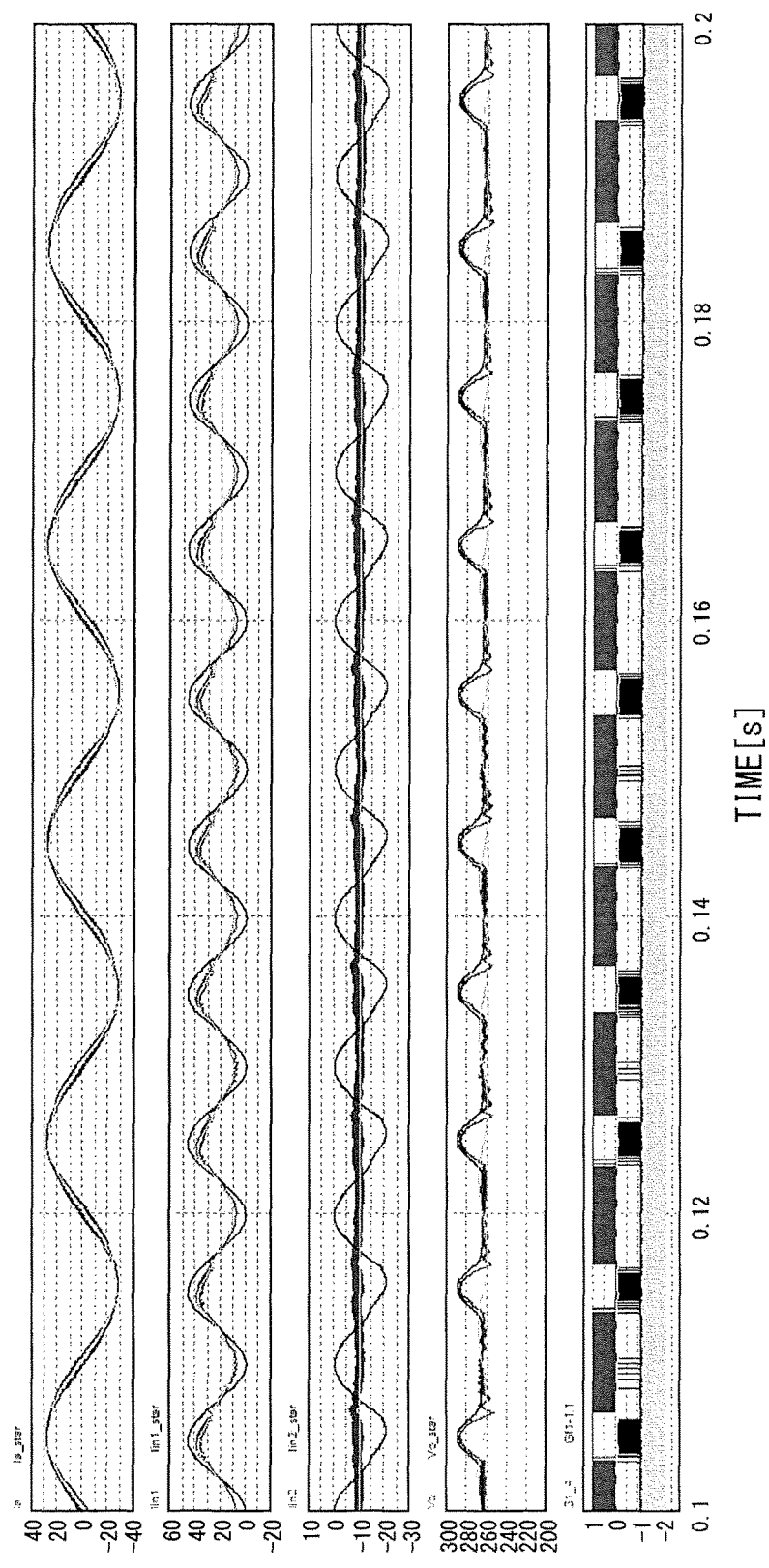
FIG. 15 is a waveform diagram of the power conversion device that is charging the storage battery in a state in which there is a power generated by the photovoltaic panel, in verification example 3 (after current smoothing).

FIG. 14 and FIG. 15 are waveform diagrams of the power conversion device 50 that is charging the storage battery 3B in a state in which there is a power generated by the photovoltaic panel 3P. The voltage of the storage battery 3B is 200 V which is lower than the optimum operation voltage of the photovoltaic panel 3P. In addition, the generated power is 6 kW, the charge power is 2 kW, and the reverse-flow power is 4 kW. FIG. 14 shows a case of not performing the control relevant to reactive current, and FIG. 15 shows a case of performing the control.

The AC current $I_a$ and the total harmonic distortion THD before current smoothing (FIG. 14) and after current smoothing (FIG. 15) are as follows.

Before current smoothing (FIG. 14) $I_a$: 19.7 Arms, THD: 3.2%

After current smoothing (FIG. 15) $I_a$: 19.2 Arms, THD: 4.0%

In this case, current does not flow through the DC/DC converter 2 unless the voltage thereof is raised to the same voltage as output of the DC/DC converter 1, and therefore the DC/DC converter 2 always performs switching. After current smoothing, the current of the DC/DC converter 2 is almost smoothed, and the amplitude of a pulsating current of the DC/DC converter 1 is also reduced. Even after current smoothing, the switching period of the DC/DC converter 1 is separated from the switching period of the DC/AC converter 8 without overlapping, and the number of times of switching thereof is not increased.

Verification Example 4: Generated Power 6 kW, Charge Power 2 kW, Reverse-Flow Power 4 kW)

Figure 16:
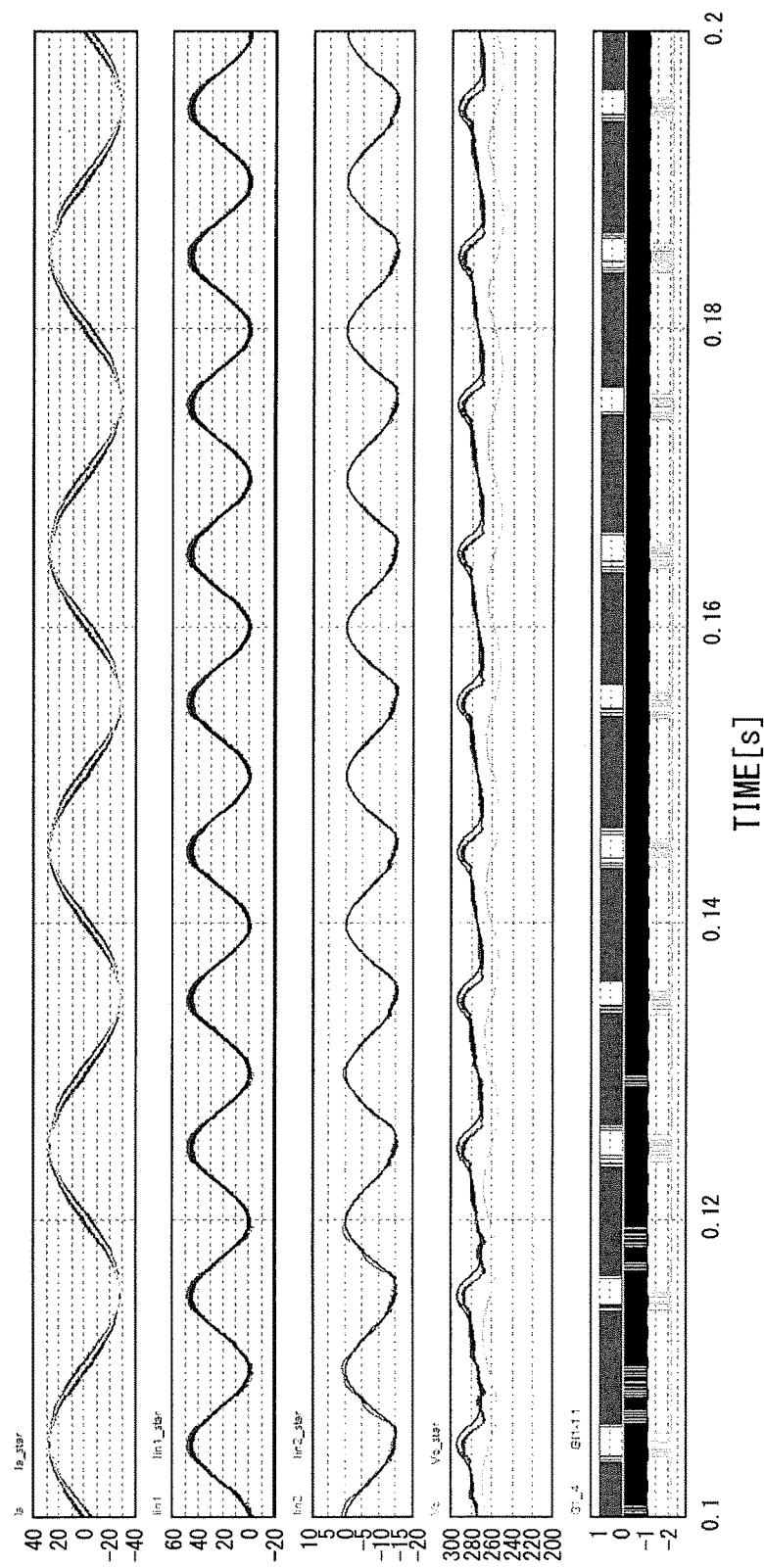
FIG. 16 is a waveform diagram of the power conversion device that is charging the storage battery in a state in which there is a power generated by the photovoltaic panel, in verification example 4 (before current smoothing).
Figure 17:
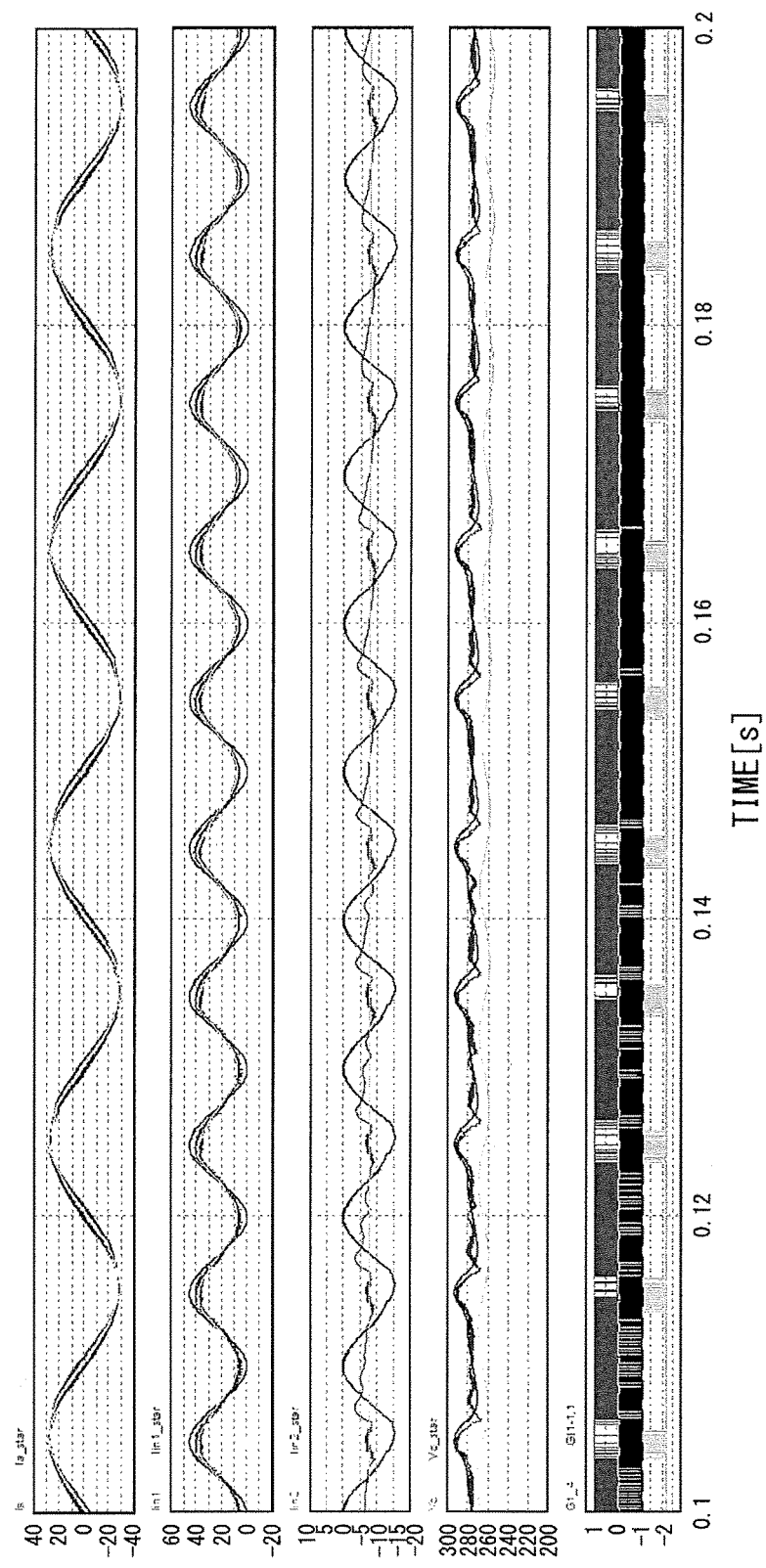
FIG. 17 is a waveform diagram of the power conversion device that is charging the storage battery in a state in which there is a power generated by the photovoltaic panel, in verification example 4 (after current smoothing).

FIG. 16 and FIG. 17 are waveform diagrams of the power conversion device 50 that is charging the storage battery 3B in a state in which there is a power generated by the photovoltaic panel 3P. It is noted that the voltage of the storage battery 3B is 275 V which is higher than the optimum operation voltage of the photovoltaic panel 3P. In addition, the generated power is 6 kW, the charge power is 2 kW, and the reverse-flow power is 4 kW. FIG. 16 shows a case of not performing the control relevant to reactive current, and FIG. 17 shows a case of performing the control. In this case, the DC/DC converter 1 always performs switching. It is found that it is possible to perform current smoothing even when the voltage of the storage battery 3B is higher than that of the photovoltaic panel 3P.

The AC current $I_a$ and the total harmonic distortion THD before current smoothing (FIG. 16) and after current smoothing (FIG. 17) are as follows.

Before current smoothing (FIG. 16) $I_a$: 19.8 Arms, THD: 2.8%

After current smoothing (FIG. 17) $I_a$: 20.0 Arms, THD: 3.2%

(Verification Example 5: Generated Power 4 kW, Discharge Power 2 kW, Reverse-Flow Power 6 kW)

Figure 18:
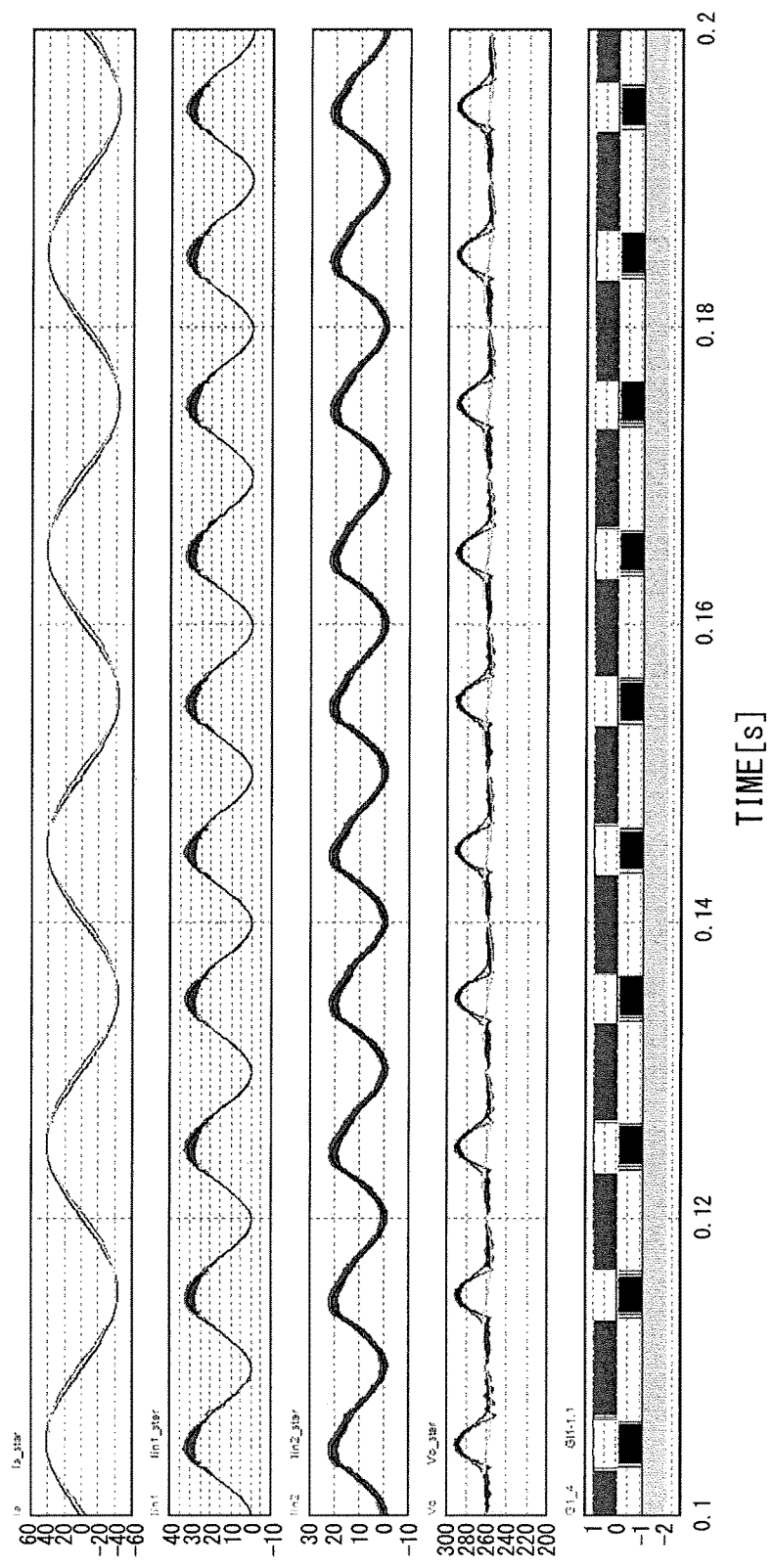
FIG. 18 is a waveform diagram of the power conversion device that is discharging the storage battery in a state in which there is a power generated by the photovoltaic panel, in verification example 5 (before current smoothing).
Figure 19:
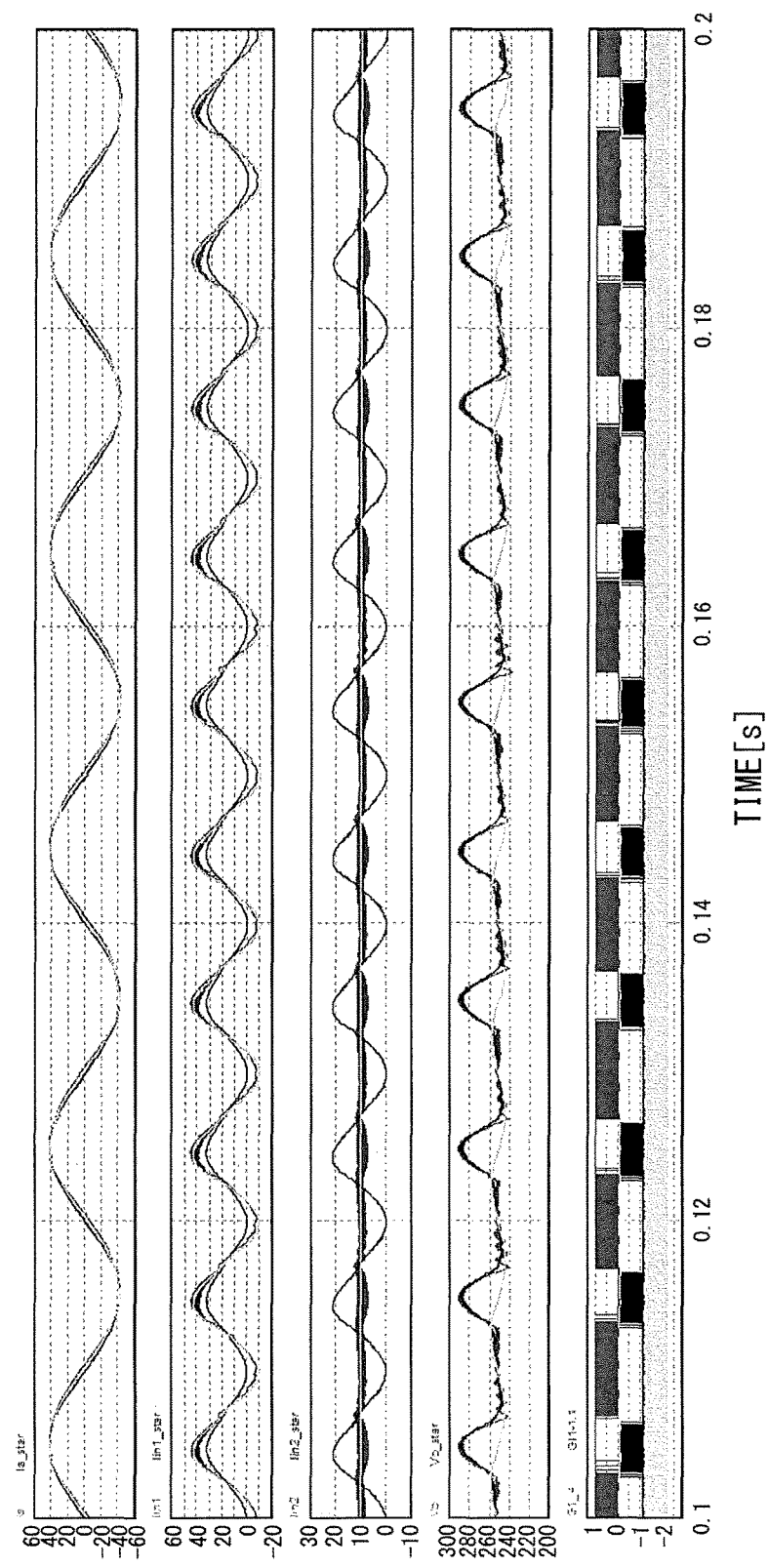
FIG. 19 is a waveform diagram of the power conversion device that is discharging the storage battery in a state in which there is a power generated by the photovoltaic panel, in verification example 5 (after current smoothing).

FIG. 18 and FIG. 19 are waveform diagrams of the power conversion device 50 that is discharging the storage battery 3B in a state in which there is a power generated by the photovoltaic panel 3P. The voltage of the storage battery 3B is 200 V. In addition, the generated power is 4 kW, the discharge power is 2 kW, and the reverse-flow power is 6 kW. FIG. 18 shows a case of not performing the control relevant to reactive current, and FIG. 19 shows a case of performing the control. Also in this case, current smoothing for the DC/DC converter 2 is performed without any problem. The DC/DC converter 1 has a switching stop period, and even after smoothing, the original operation in which the DC/DC converter 1 and the DC/AC converter 8 alternately perform switching, is maintained.

The AC current $I_a$ and the total harmonic distortion THD before current smoothing (FIG. 18) and after current smoothing (FIG. 19) are as follows.

Before current smoothing (FIG. 18) $I_a$: 29.3 Arms, THD: 1.7%

After current smoothing (FIG. 19) $I_a$: 29.7 Arms, THD: 2.7% ( Verification Example 6: Generated Power 4 kW, Discharge Power 2 kW, Reverse-Flow Power 6 kW)

Figure 20:
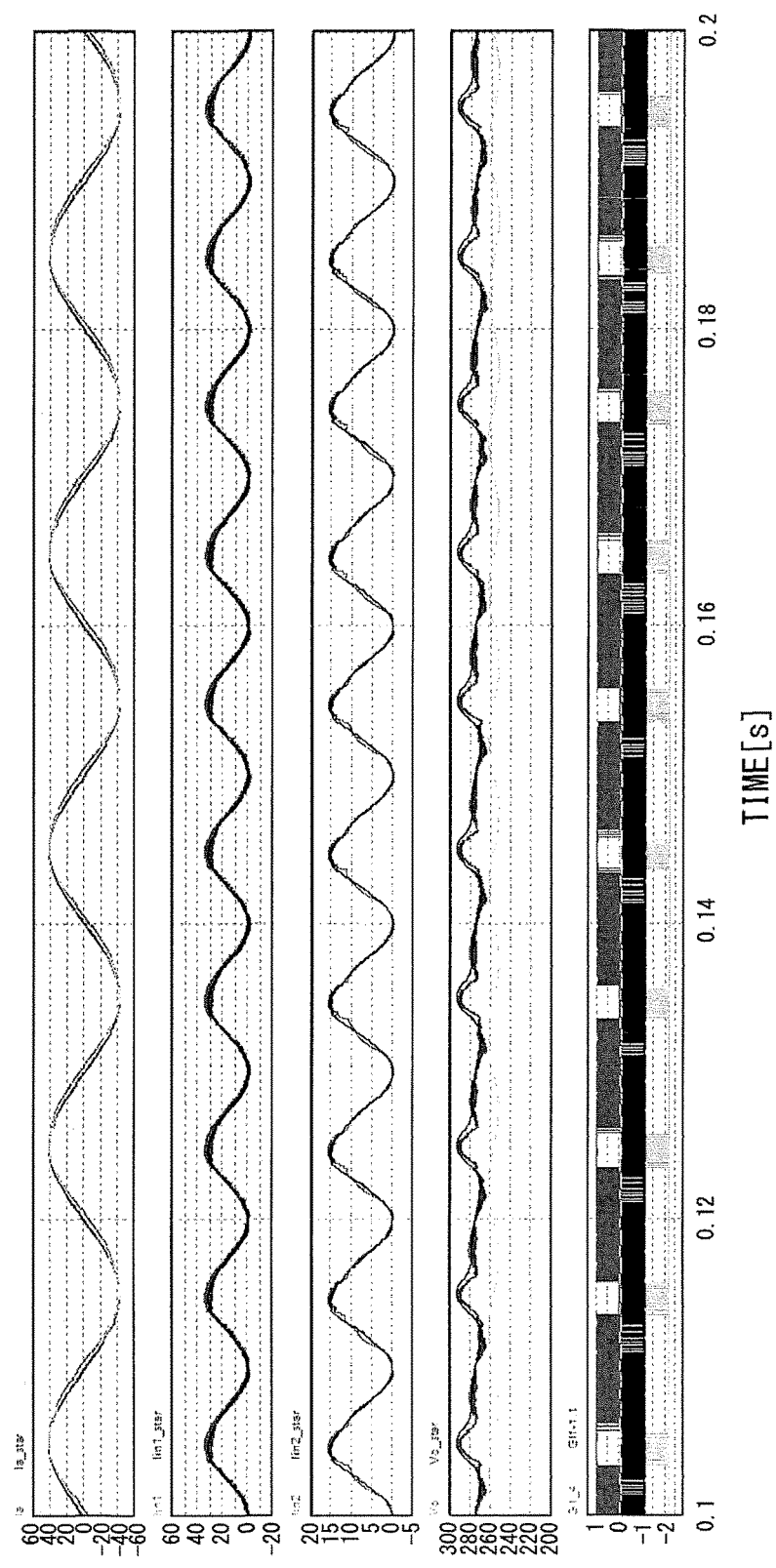
FIG. 20 is a waveform diagram of the power conversion device that is discharging the storage battery in a state in which there is a power generated by the photovoltaic panel, in verification example 6 (before current smoothing).
Figure 21:
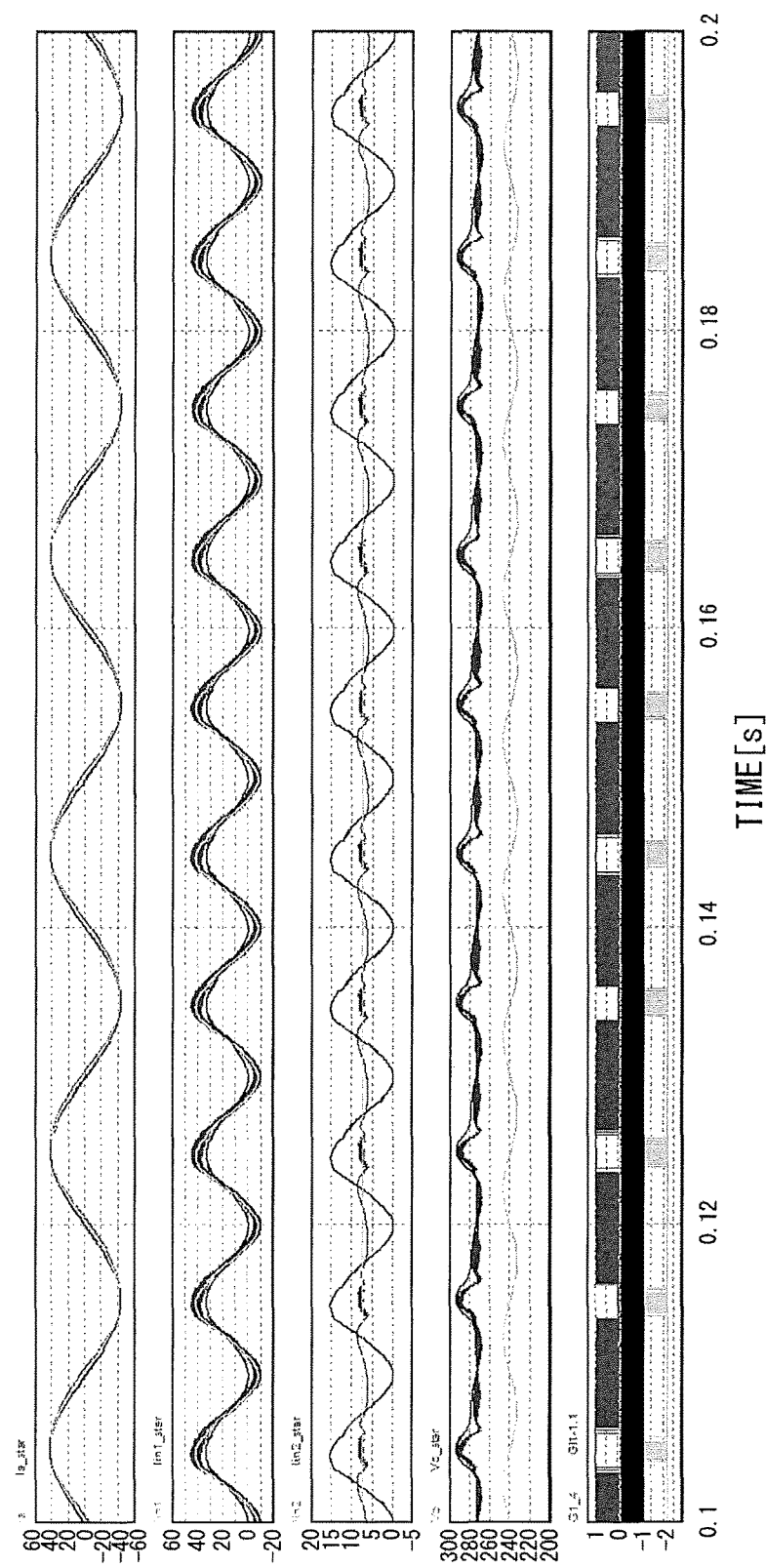
FIG. 21 is a waveform diagram of the power conversion device that is discharging the storage battery in a state in which there is a power generated by the photovoltaic panel, in verification example 6 (after current smoothing).

FIG. 20 and FIG. 21 are waveform diagrams of the power conversion device 50 that is discharging the storage battery 3B in a state in which there is a power generated by the photovoltaic panel 3P. The voltage of the storage battery 3B is 275 V. In addition, the generated power is 4 kW, the discharge power is 2 kW, and the reverse-flow power is 6 kW. FIG. 20 shows a case of not performing the control relevant to reactive current, and FIG. 21 shows a case of performing the control. Also in this case, current smoothing for the DC/DC converter 2 is performed without any problem. The DC/DC converter 2 has a switching stop period, and even after smoothing, the original operation in which the DC/DC converter 2 and the DC/AC converter 8 alternately perform switching, is maintained.

The AC current $I_a$ and the total harmonic distortion THD before current smoothing (FIG. 20) and after current smoothing (FIG. 21) are as follows.

Before current smoothing (FIG. 20) $I_a$: 29.6 Arms, THD: 1.9%

After current smoothing (FIG. 21) $I_a$: 29.4 Arms, THD: 1.9%

(Verification Example 7: Generated Power 4 kW, Discharge Power 2 kW, Reverse-Flow Power 6 kW)

Figure 22:
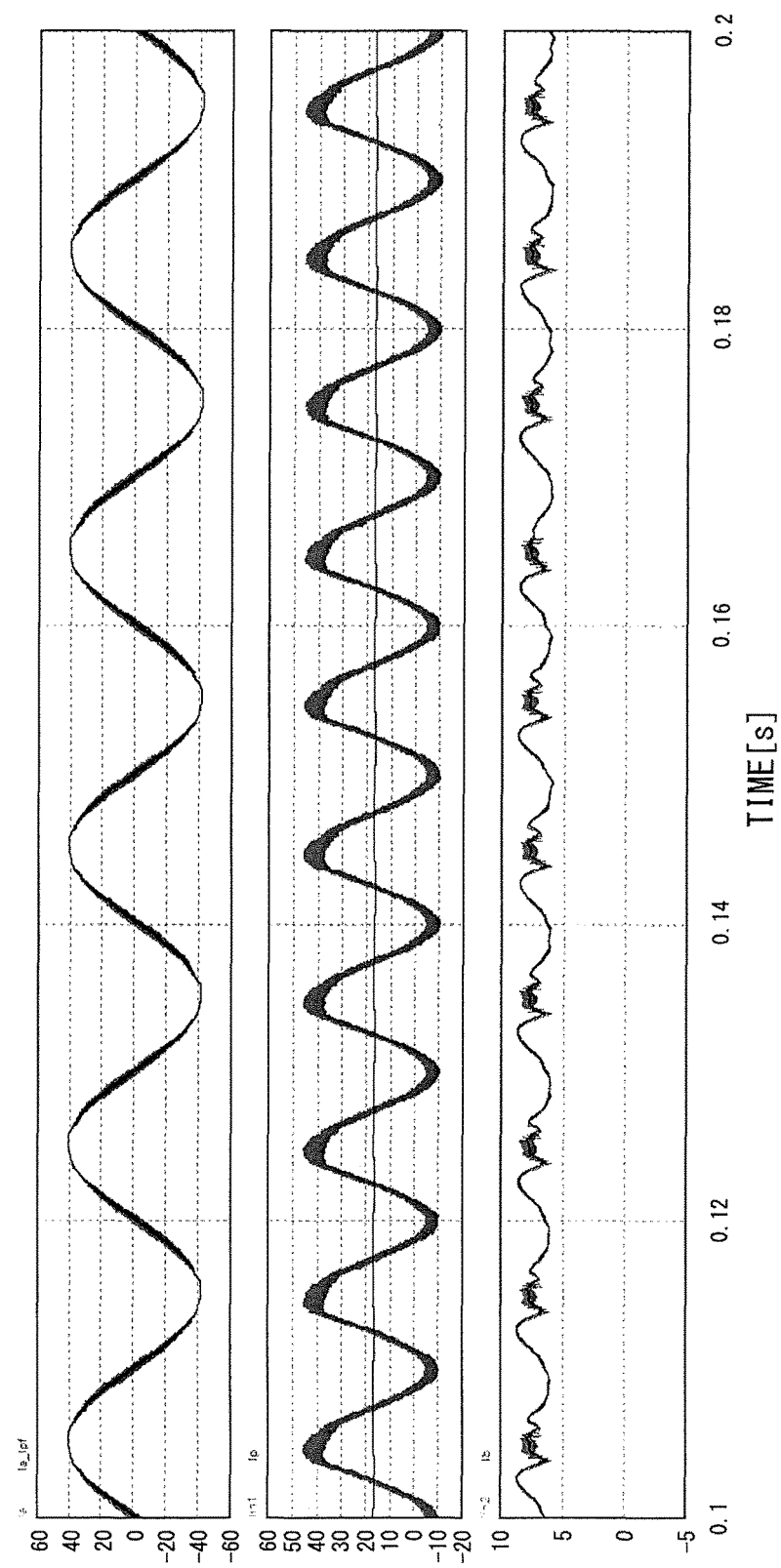
FIG. 22 is a waveform diagram of an AC current $I_a$, an output current Ip of the photovoltaic panel, and an output current Ib of the storage battery under the condition in FIG. 21, in verification example 7 (after current smoothing).

The upper stage, the middle stage, and the lower stage in FIG. 22 show waveform diagrams of the AC current $I_a$, the output current Ip of the photovoltaic panel 3P, and the output current Ib of the storage battery 3B, respectively, under the condition in FIG. 21.

The current flowing through the DC/DC converter 1 to which the photovoltaic panel 3P is connected contains a reactive current, but it is found that, through smoothing by the DC-side capacitor 4, the output current Ip becomes almost a constant value. In this case, the values of $I_a$ and THD after current smoothing are as follows.

$I_a$: 29.4 Arms, THD: 1.9%

<<Supplement>>

It is noted that the embodiments disclosed herein are merely illustrative in all aspects and should not be recognized as being restrictive. The scope of the present invention is defined by the scope of the claims, and is intended to include meaning equivalent to the scope of the claims and all modifications within the scope.

<<Additional Note>>

The above description includes the features in the additional note below. That is, the power conversion device can also be expressed as follows.

A power conversion device that performs DC/AC power conversion via an intermediate bus, the power conversion device including:

a first DC/DC converter provided between a first DC power supply or a load, and the intermediate bus;

a second DC/DC converter provided between a DC-side capacitor and the intermediate bus;

an intermediate capacitor connected to the intermediate bus;

a DC/AC converter provided between the intermediate bus and an AC grid; and a control unit configured to control the first DC/DC converter, the second DC/DC converter, and the DC/AC converter, the control unit making such current command value setting that the first DC/DC converter most supplies an active current of a current flowing through the intermediate bus and the second DC/DC converter most supplies a reactive current of the current flowing through the intermediate bus.

REFERENCE SIGNS LIST 1, 2 DC/DC converter
3B storage battery
3P photovoltaic panel
4, 5 DC-side capacitor
6 intermediate bus
7 intermediate capacitor
8 DC/AC converter
9 AC-side capacitor
11, 12 DC reactor
13 AC reactor
14 filter circuit
15 AC load
16 commercial power grid
17 AC grid
20 control unit
21, 22 switch
31, 32 voltage sensor
33, 34 current sensor
35 voltage sensor
36 current sensor
37 voltage sensor
50 power conversion device
Q11, Q12, Q21, Q22, Q81, Q82, Q83, Q84 switching element
d11, d12, d21, d22 diode

The invention claimed is:

1. A power conversion device that performs DC/AC power conversion via an intermediate bus, the power conversion device comprising:

a first DC/DC converter provided between a first DC power supply or a load, and the intermediate bus;

a second DC/DC converter provided between a DC-side capacitor and the intermediate bus;

an intermediate capacitor connected to the intermediate bus;

a DC/AC converter provided between the intermediate bus and an AC grid; and a control unit configured to control the first DC/DC converter, the second DC/DC converter, and the DC/AC converter, the control unit making a current command value setting that mainly the second DC/DC converter supplies a reactive current flowing through the intermediate bus, wherein the control unit performs control so that a sum of a power passing through the first DC/DC converter and a power passing through the second DC/DC converter coincides with a sum of a reactive power for the intermediate capacitor and a power arising on an AC side of the DC/AC converter.

2. The power conversion device according to claim 1, wherein a filter circuit including an AC reactor and including the AC side capacitor on an AC side with respect to the AC reactor is provided on an AC side of the DC/AC converter, the filter circuit being connected to the AC grid, and the control unit performs control so that a sum of a power of the AC grid and a power of the AC-side capacitor coincides with a power transferred between the AC reactor and the DC/AC converter.

3. The power conversion device according to claim 1, wherein the control unit sets current command values so that a reactive current flowing through the first DC/DC converter becomes zero and the second DC/DC converter supplies an entire reactive current.

4. The power conversion device according to claim 1, wherein the control unit controls, by the current command value setting, reactive currents of the first DC/DC converter and the second DC/DC converter so that peak values of currents flowing through the first DC/DC converter and the second DC/DC converter are minimized.

5. The power conversion device according to claim 1, wherein the control unit controls, by the current command value setting, reactive currents of the first DC/DC converter and the second DC/DC converter so that mean square values of currents flowing through the first DC/DC converter and the second DC/DC converter are minimized.

6. The power conversion device according to claim 1, wherein the current command value setting for supplying the reactive current is to allocate some or all of terms depending on time that are included in a mathematical expression representing a current flowing through the intermediate bus.

7. The power conversion device according to claim 1, wherein
the DC-side capacitor is an element that closes a terminal end circuit on a DC side.

8. The power conversion device according to claim 7, wherein
the control unit controls, by the current command value setting, the reactive current of the second DC/DC converter so that a voltage between both ends of the DC-side capacitor coincides with a voltage of the first DC power supply or the load.

9. The power conversion device according to claim 1, wherein
a second DC power supply is connected in parallel to both ends of the DC-side capacitor.

10. The power conversion device according to claim 9, wherein
a switch that is electrically openable and closable is provided between the DC-side capacitor and the second DC power supply.

11. The power conversion device according to claim 1, wherein
the control unit sets current command values so that a reactive current flowing through the first DC/DC converter becomes zero and the second DC/DC converter supplies an entire reactive current.

12. The power conversion device according to claim 1, wherein
the control unit controls, by the current command value setting, reactive currents of the first DC/DC converter and the second DC/DC converter so that peak values of currents flowing through the first DC/DC converter and the second DC/DC converter are minimized.

13. The power conversion device according to claim 1, wherein
the control unit controls, by the current command value setting, reactive currents of the first DC/DC converter and the second DC/DC converter so that mean square values of currents flowing through the first DC/DC converter and the second DC/DC converter are minimized.

14. A control method for a power conversion device that includes: a first DC/DC converter provided between a first DC power supply or a load, and an intermediate bus; a second DC/DC converter provided between a DC-side capacitor and the intermediate bus; an intermediate capacitor connected to the intermediate bus; a DC/AC converter provided between the intermediate bus and an AC grid; and a control unit configured to control the first DC/DC converter, the second DC/DC converter, and the DC/AC converter, the power conversion device being configured to perform DC/AC power conversion via the intermediate bus, the control method being executed by the control unit and comprising:
making a current command value setting that mainly the second DC/DC converter supplies a reactive current flowing through the intermediate bus, and
performing control so that a sum of a power passing through the first DC/DC converter and a power passing through the second DC/DC converter coincides with a sum of a reactive power for the intermediate capacitor and a power arising on an AC side of the DC/AC converter.

15. A power conversion device that performs DC/AC power conversion via an intermediate bus, the power conversion device comprising:
a first DC/DC converter provided between a first DC power supply or a load, and the intermediate bus;
a second DC/DC converter provided between a DC-side capacitor and the intermediate bus;
an intermediate capacitor connected to the intermediate bus;
a DC/AC converter provided between the intermediate bus and an AC grid; and
a control unit configured to control the first DC/DC converter, the second DC/DC converter, and the DC/AC converter, the control unit making a current command value setting that the first DC/DC converter most supplies an active current of a current flowing through the intermediate bus and the second DC/DC converter most supplies a reactive current of the current flowing through the intermediate bus, wherein
the control unit performs control so that a sum of a power passing through the first DC/DC converter and a power passing through the second DC/DC converter coincides with a sum of a reactive power for the intermediate capacitor and a power arising on an AC side of the DC/AC converter.

* * * * *